United States Patent [19]
Williams et al.

[11] 4,422,074
[45] Dec. 20, 1983

[54] SIGNAL SKIMMING SYSTEM

[75] Inventors: Barry E. Williams, Downey; Norol T. Evans, San Pedro; John A. Propster, La Mirada, all of Calif.

[73] Assignee: Hughes Aircraft Company, El Segundo, Calif.

[21] Appl. No.: 458,971

[22] Filed: May 26, 1965

[51] Int. Cl.³ .............................................. G01S 13/16
[52] U.S. Cl. .................................. 343/5 CF; 343/7 A
[58] Field of Search ............... 343/5 DP, 17.1, 5 CF, 343/7 A; 325/318, 319, 473, 478

[56] References Cited
U.S. PATENT DOCUMENTS

| | | | |
|---|---|---|---|
| 3,286,257 | 11/1966 | Trafford et al. | 343/5 CF X |
| 3,374,479 | 3/1968 | Moore | 343/5 CF X |
| 3,430,235 | 2/1969 | Bender et al. | 343/7 A |
| 3,582,872 | 6/1971 | Prager | 343/7 A X |
| 3,944,965 | 3/1976 | Caporin et al. | 343/7 A X |

*Primary Examiner*—T. H. Tubbesing
*Attorney, Agent, or Firm*—Robert Thompson; A. W. Karambelas

EXEMPLARY CLAIM

1. A system responsive to a composite signal including first signals in the presence of second signals and detecting the presence of said first signals with a selected threshold level ratio of signal voltage to noise voltage comprising means for integrating the composite signal over selected intervals of time, means for comparing a selectable threshold level with the integrated signals, means for storing data to provide said threshold level, counting means responsive to the integrated signals exceeding the threshold level to accumulate a count thereof, constant selector means responsive to the count of said counting means to establish a proportion of the value of said stored data for changing said threshold level to maintain the selected threshold level ratio, and means responsive to said constant selector means for correcting the stored data after a selected number of said intervals of time.

12 Claims, 33 Drawing Figures

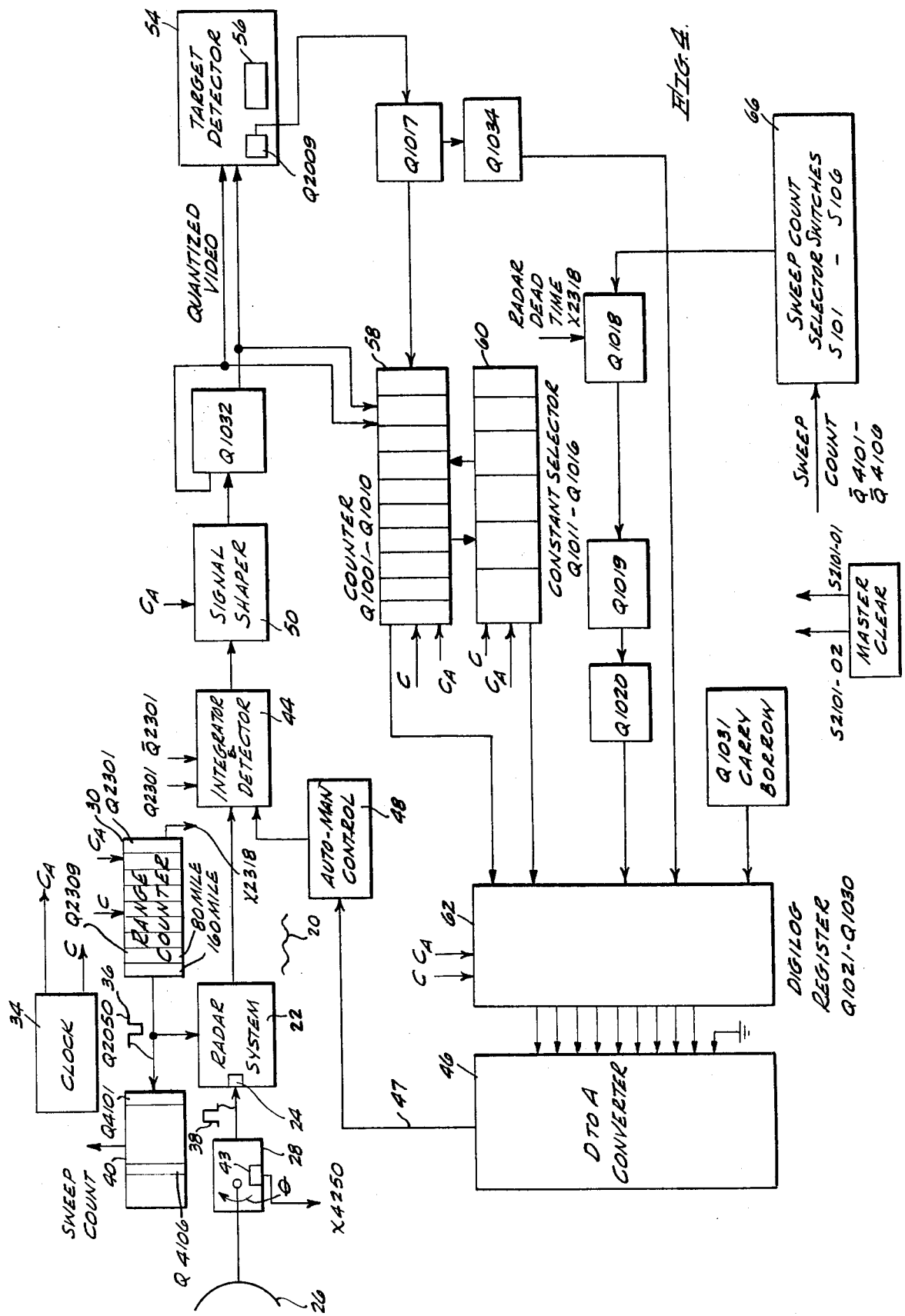

FIG. 19.
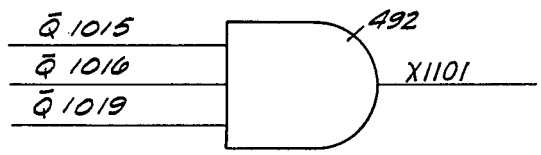
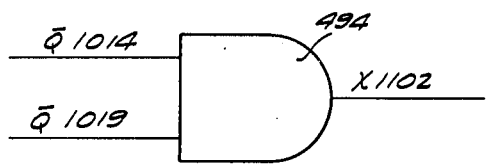
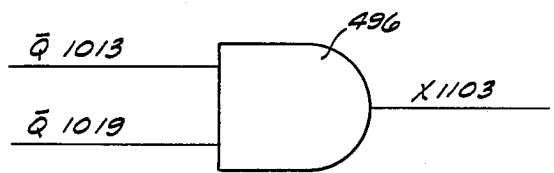
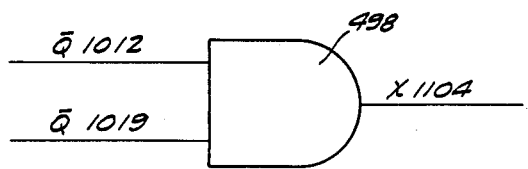
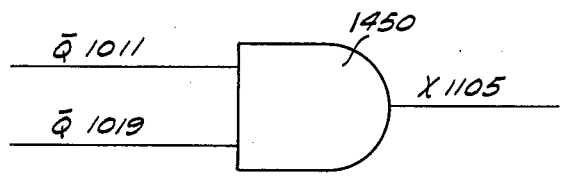
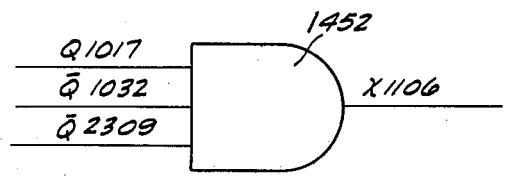
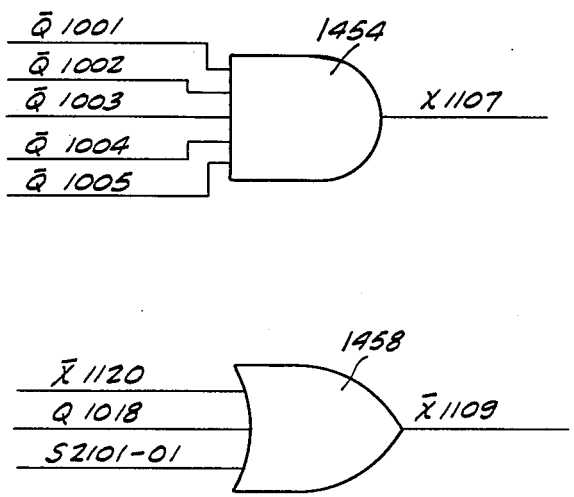
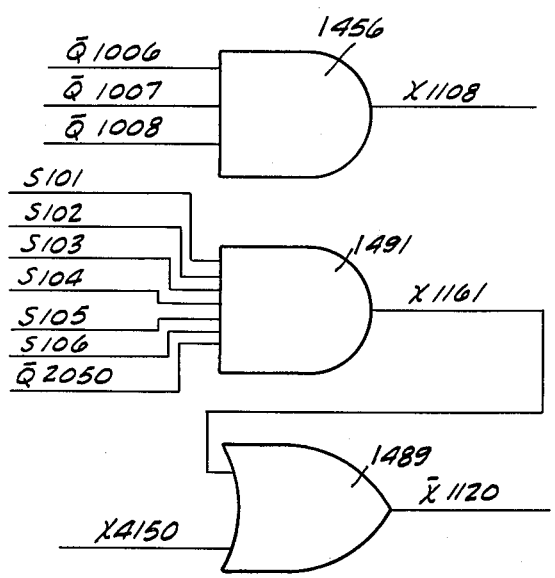
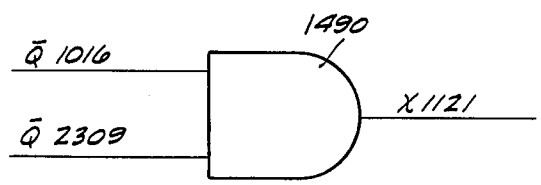
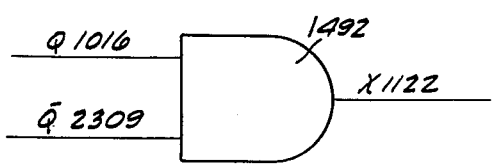

FIG. 22.
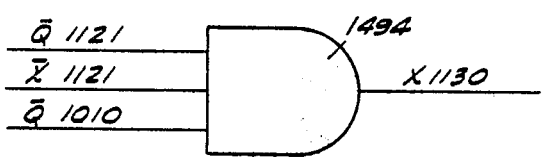
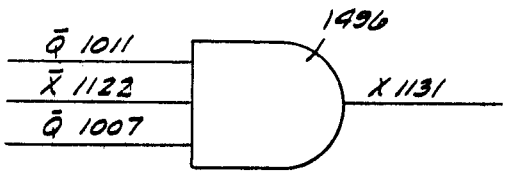
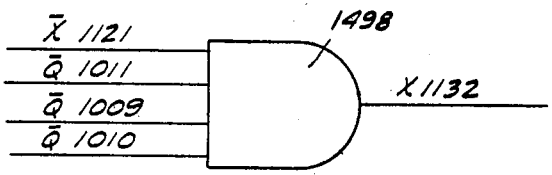
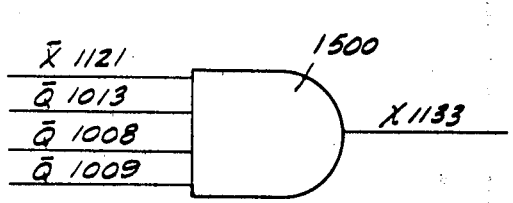
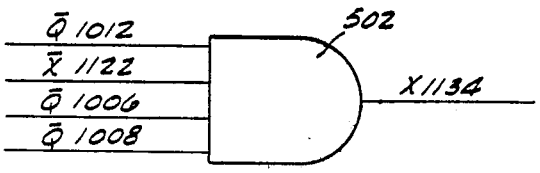
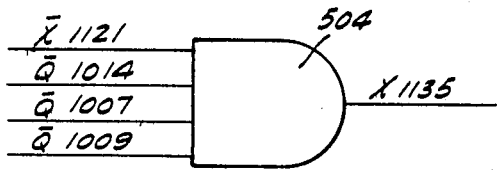
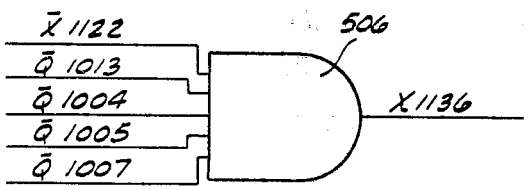
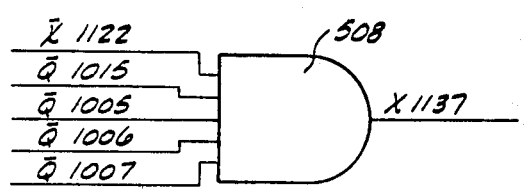
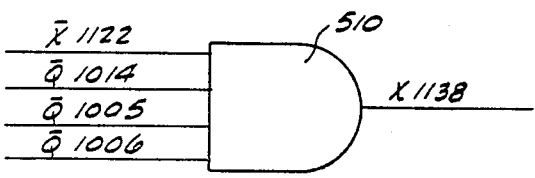
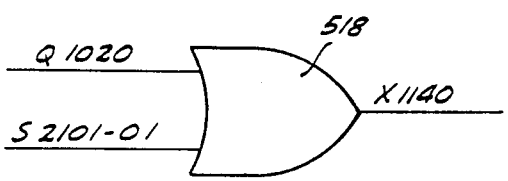
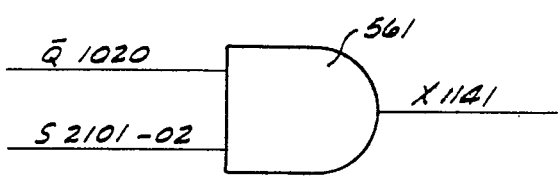
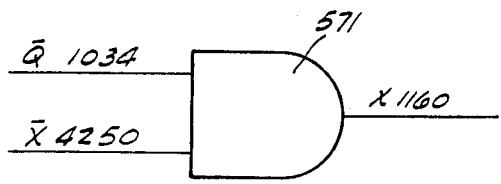

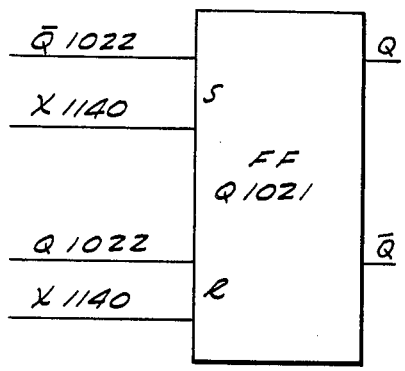
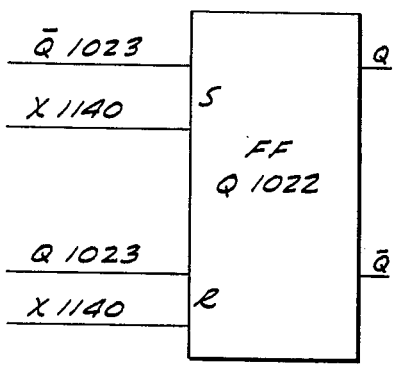
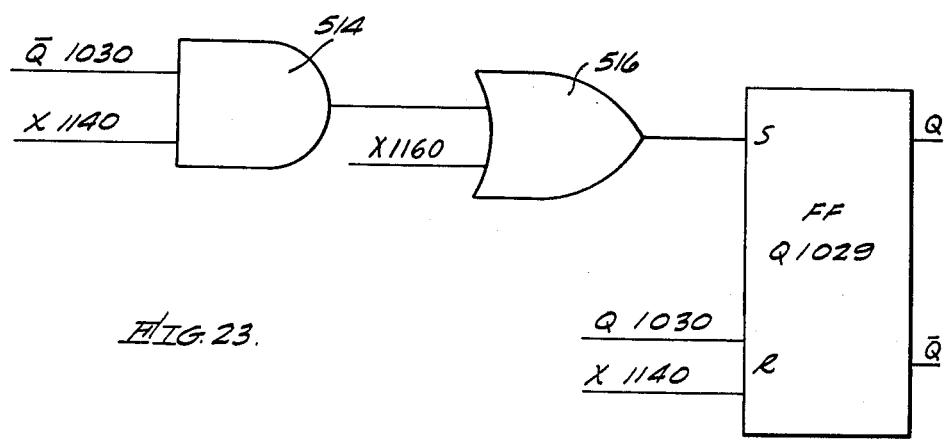
FIG. 23.

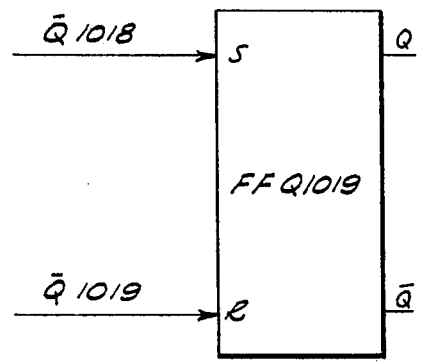
FIG. 28.
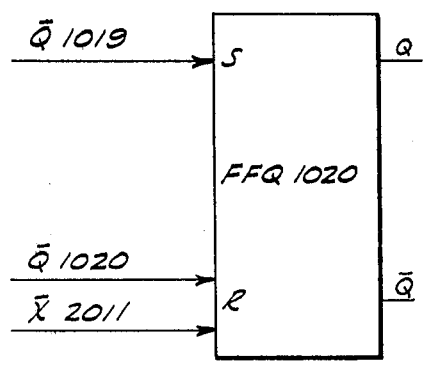
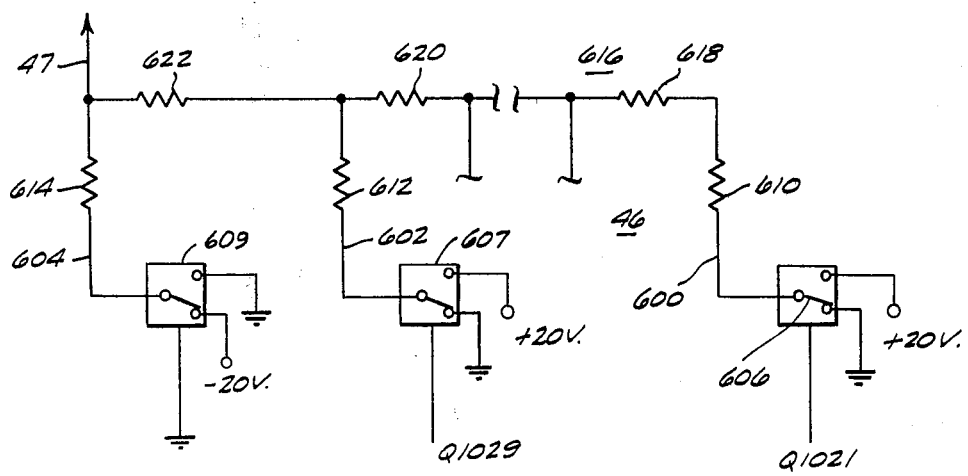
FIG. 30.

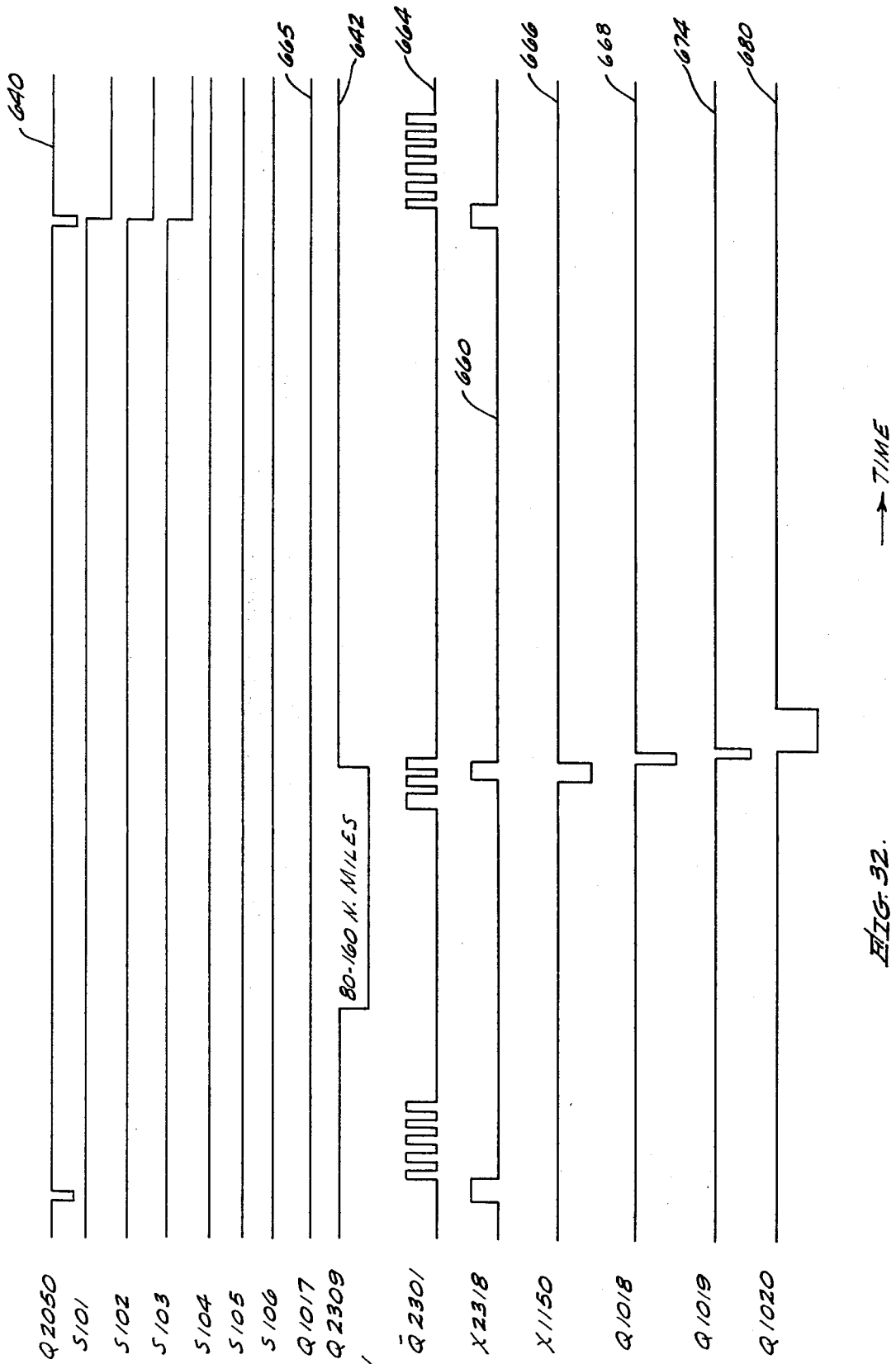

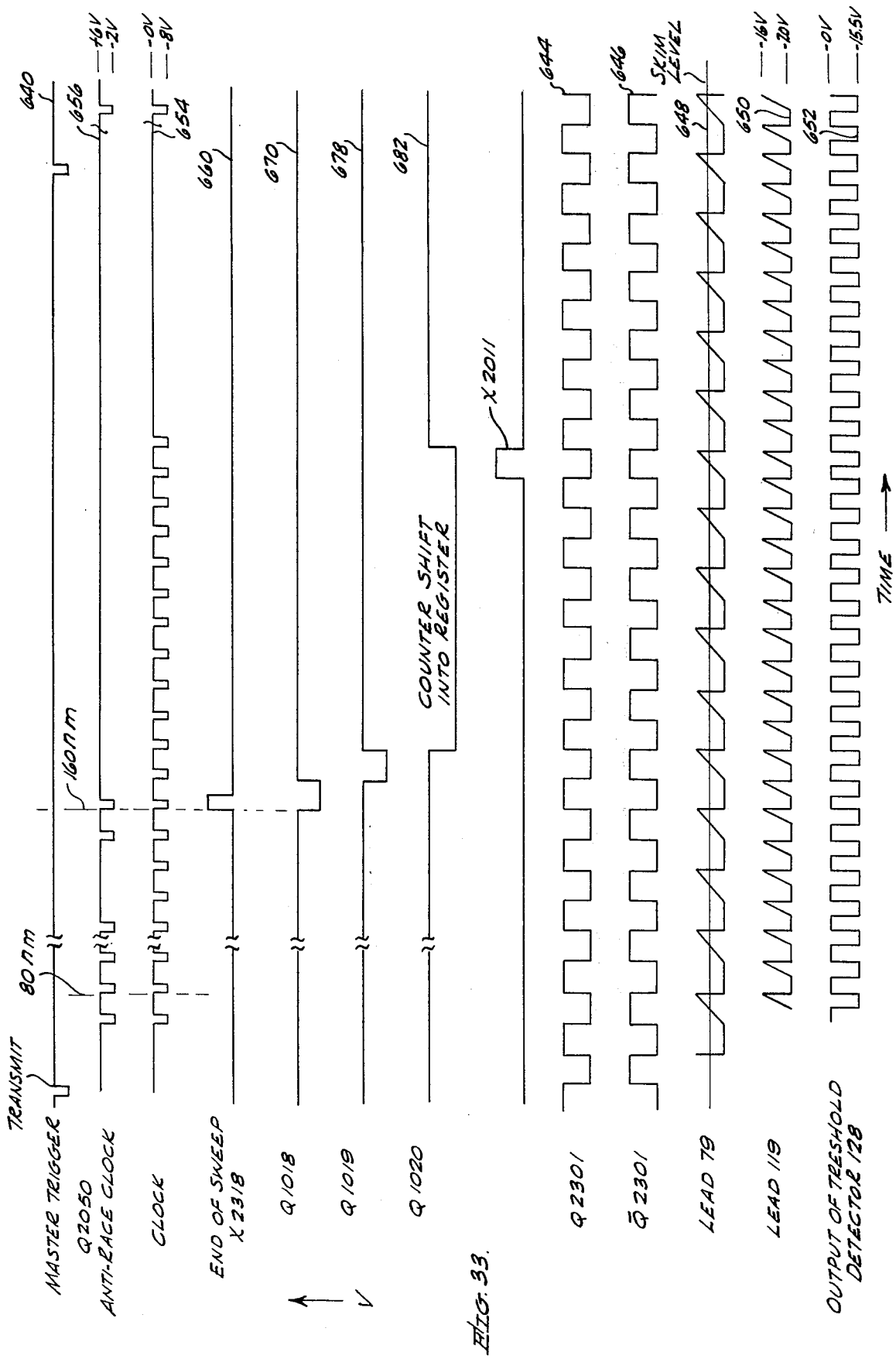

SIGNAL SKIMMING SYSTEM

This invention relates to signal skimmers operable in radar type systems and particularly to an improved closed loop signal skimmer that extracts and detects desired signals in the presence of noise signals with a relatively low threshold or skim level and with a substantially constant false alarm rate.

In radar systems for determining the presence of targets, one of the most important functions is the target detection process which separates valid target signals from a plurality of other signals such as noise and interference signals by maintaining a threshold detection level. Because the target detection operation is normally followed by target correlating systems in which the presence of a valid target is further determined by utilizing statistical principles, a constant false alarm rate (that is the probability of noise alone exceeding the threshold voltage level is maintained at a selected percentage) is a necessity for reliable operation. A typical video-correlation criterion for selecting target conditions is 8 hits or detected signals out of 10 possible hits within an integration window or over an area which may extend in range or azimuth. If the skimmer and the associated statistical correlator are designed for a false alarm rate of 13 percent, for example, and if the false alarm rate from the skimmer increases during operation to 26 percent, the false alarm target rate from the correlator may increase by 180 to 1. Also, for reliable correlation of target data it is necessary that the false alarm rate remain substantially constant at all times rather than averaged over relatively long periods of time such as a complete or a substantial portion of an azimuth or rotational scan. Another desirable feature of target detection systems is that they operate with a relatively low skim level which may be defined as the power or voltage ratio of the skim level to the RMS (root mean square) noise level. A low skim level representative of a low false alarm rate increases the number of detected targets and the reliability of the system operation.

Video signal skimmers are conventionally analog devices that essentially maintain a fixed threshold level with all signals that exceed the skim level being accepted and those below being rejected. Some of these analog circuits measure the RMS (root mean square) noise level to automatically set the video hit skim level by fixed and similar increments. These analog circuits have the disadvantages of responding slowly to changing radar environment such as interference sources, of responding slowly to changing numbers of video target hits and of being unable to maintain a constant false alarm rate. Conventional digital type video skimmers which utilize counters to count the presence of signals above the skim level at a selected range bin interval and provide correction of the skim level with a fixed voltage increment have been found to be relatively inaccurate, to provide a skim level that oscillates around the desired level and to be unable to maintain a constant false alarm rate.

It is therefore an object of this invention to provide a signal extracting system that continually maintains a substantially constant false alarm rate or percentage of false indications of noise signals as valid target signals.

It is still another object of this invention to provide a signal extracting system that detects target signals below the existing noise level with a minimum of false target entry due to noise alone.

It is still another object of this invention to provide a signal skimmer system that reliably detects target signals with a relatively low skim level or power ratio of the skim level to the RMS noise.

It is a further object of this invention to provide a signal skimmer system that essentially utilizes the statistics of the noise to determine the threshold level regardless of the strength of the signals.

It is a further object of this invention to provide a signal skimmer that effectively employs a matched filter concept to the incoming signal by integrating the input signal so as to optimally preserve the input signal-to-noise ratio.

It is a still further object of this invention to provide a video skimmer system that functions to overcome the effects of radar interference and jamming.

It is a further object of this invention to provide a video skimmer system that enables the identification of jam-strobe targets.

It is a further object of this invention to provide a video skimmer system that operates without the undesirable statistical effects of ground clutter return signals.

The signal skimmer system in accordance with the principles of the invention is a closed loop feedback system that automatically sets the threshold voltage or skimming level for detecting the presence of video target signals, for example, so as to maintain a substantially constant false alarm rate. Each radar sweep or period of reception in response to a transmitted pulse of energy is divided into a plurality of range bin intervals with the criteria for feedback being the average noise power integrated in each range bin over a selected portion of the sweeps which may be over a range interval starting at a range greater than that at which ground clutter return energy has a substantial effect. During each range bin interval at which the average noise power exceeds the skim level, a counter is incremented so as to accumulate the number of hits or skimmed signals over the selected number of sweeps.

The feedback loop for correction of the threshold level utilizes a weighted smoothing arrangement that corrects the change in false alarm rate by determining the binomial distributions as a function of a reference distribution at a selected false alarm rate and skim level and a selected confidence interval at each distribution. A sample point just measured as expressed by the accumulated count in the counter determines the corresponding confidence interval and the false alarm rate of the presently operating skim level. As the reference count is established for the selected false alarm rate, all other counts are corrected by binary correction constants based on selected intervals of the count M and being a function of the ratio of the probability of obtaining the reference false alarm rate at the accumulated count to the probability of obtaining the accumulated count. During a correction cycle after the selected number of sweeps, if the accumulated count is below or above the reference count and its confidence interval, the skim level is respectively lowered or raised by subtracting or adding a selected portion of the stored skim level value from the skim level or to the skim level. During the counting operation, a group of constant selector flip flops are set to store the proper weighting constant to be utilized during the correction cycle. The constant selector flip flops then control parallel shifting of the digital skim level data from a skim level storage register to the counter at a position of weighted significance. The contents of the register and the counter are then serially shifted through an adder into the register to perform either the addition or subtraction and develop the corrected digital skim level. The correction constants and the confidence intervals are selected to provide an over damped loop response and a skim level correction that provides a high degree of servo stability. A converter applies an analog equivalent skim voltage from the register to a threshold detection circuit for comparison with the integrated signals. During a radar interference or jamming condition, either in response to the counter overflowing or to a detected jamming condition, the correction cycle is inhibited and the skim level is maintained at its previous value. An arrangement is provided to continue normal skimmer operation at the termination of a jamming condition by forcing an increased skim level value into the register independent of the normal correction cycle.

The novel features of the invention, as well as the invention itself, both as to its organization and method of operation, will best be understood from the accompanying description taken in connection with the accompanying drawings, in which like reference characters refer to like parts, and in which:

FIG. 4 is a schematic block diagram of the video skimmer and target detection system in accordance with the principles of the invention;

FIG. 19 is a schematic circuit diagram of counting and control gates utilized in the system of FIG. 4;

FIG. 22 is a schematic circuit diagram of control gates utilized in the system of FIG. 4;

FIG. 23 is a schematic circuit and block diagram of the flip flops Q1021, Q1022 and Q1029 of the digilog register of FIG. 4, the flip flop Q1021 representing the least significant bit position;

FIG. 28 is a schematic circuit and block diagram of the flip flops Q1019 and Q1020 respectively utilized as the counter load control and the counter shift-add control flip flops in the skimmer system of FIG. 4;

FIG. 30 is a schematic circuit and block diagram of a typical digital to analog converter circuit that may be utilized in the system of FIG. 4;

FIG. 32 is a schematic diagram showing waveforms of voltage versus time for further explaining the operation of the skimmer system to perform a correction cycle after a selected number of sweep intervals; and FIG. 33 is a schematic diagram showing waveforms of voltage versus time for further explaining the add or subtract operation during a correction cycle.

Figure 1:
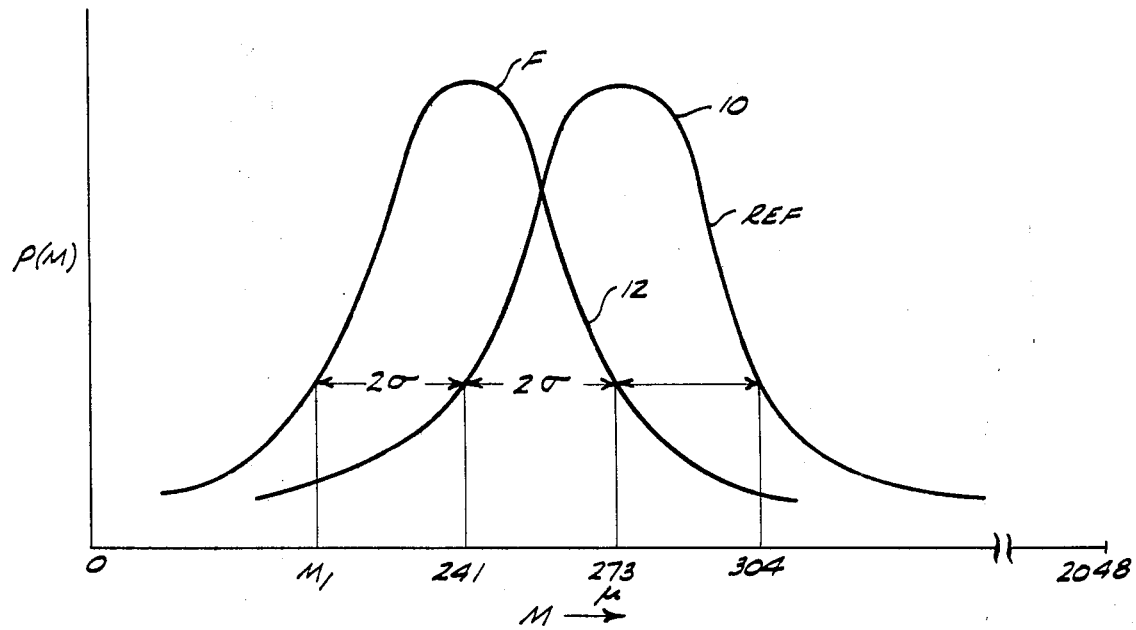
FIG. 1 is a graph showing curves of probability of obtaining a count versus the accumulated count of target signals after integration of video signals during each range bin interval for explaining the skim level correction operation.
Figure 3:
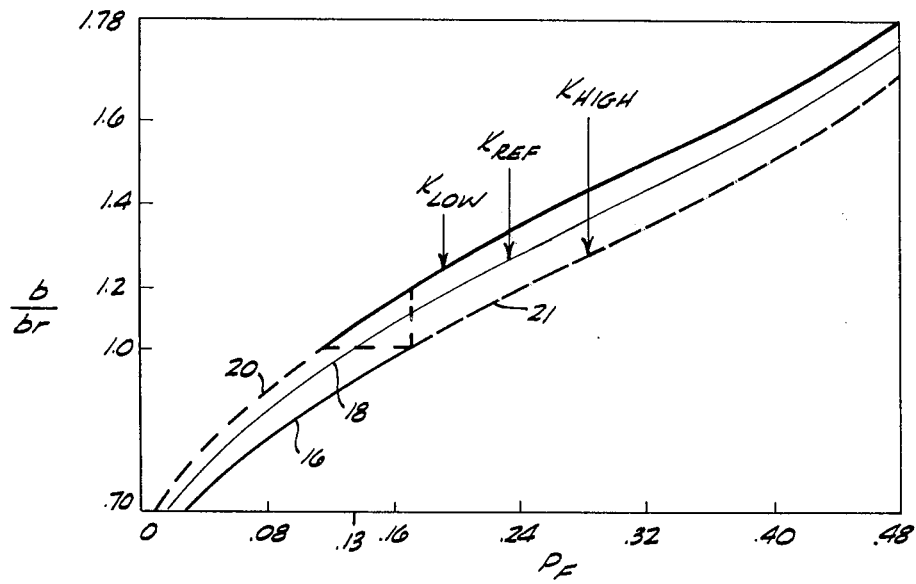
FIG. 3 is a graph of the ratio of the skim level to the reference skim level versus false alarm rate for further explaining the selection of correction constants utilized in the system of the invention.
Figure 2:
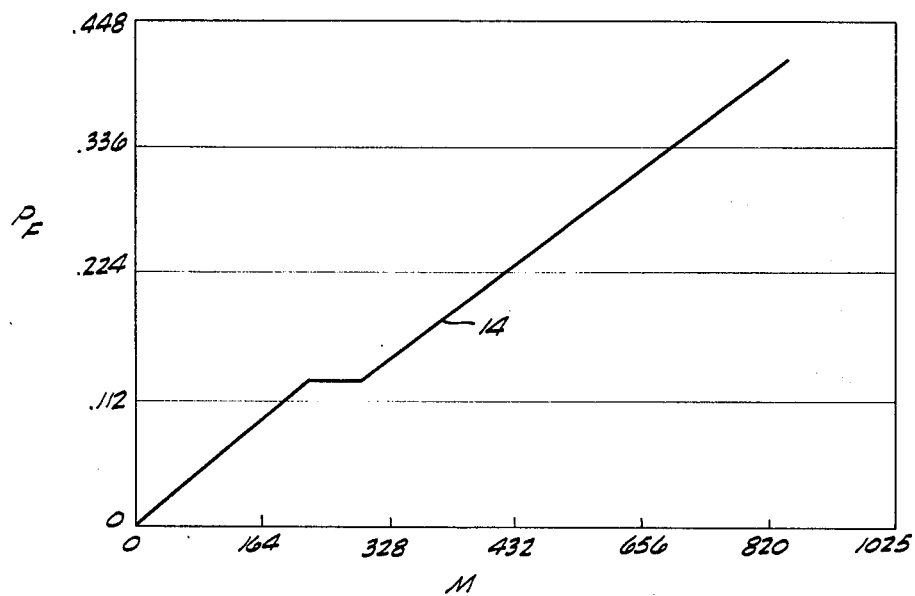
FIG. 2 is a graph of false alarm rate versus accumulated signal count for explaining the selection of the weighted correction constants utilized in the system of the invention.

Referring first to FIGS. 1, 2 and 3, the video signal skimmer in accordance with the principles of the invention includes a closed loop feedback system to automatically control the setting of the threshold voltage or skim level so as to maintain a substantially constant false alarm rate. The criteria for feedback is the average noise power sensed in each range bin for a selected range interval of each of a predetermined number of sweeps. The average noise power provides a reliable indication of the signal indeterminancy and a reliable basis on which to adjust the threshold level to maintain a substantially constant false alarm rate.

The system in accordance with the invention integrates the video signal in each range bin interval for a selected last portion of the range sweep which may be the last 80 miles, for example. If the average noise power at each range bin interval exceeds the present threshold level b, a count is accumulated in the counter and if the average noise power does not exceed the level b, the count is not added to the counter. Knowledge of the number of times that the flip flop is set for a selected number of sweeps such as eight over the last 80 miles of each sweep provides an indication of the false alarm rate $P_F$ resulting from a particular threshold setting. It has been found that because of the relatively small number of target signals as compared to the noise signals, the statistical effect of the target return signals on the threshold level is relatively small. The input video signal is a random variable such that the input noise distribution to the linear detector of the radar system is bivariate nominal and the resulting distribution at the input to the video skimmer is Rayleigh for the envelope and rectangular for the phase. Thus the probability $P_F$ that noise alone will exceed a threshold level b is:

$$P_F = \int_b^\infty \frac{r}{n} e^{\frac{-r^2}{2N}} dr = e^{\frac{-b^2}{2N}} \quad (1)$$

where N=average noise power=$\sigma^2$ and r=envelope voltage. For a false alarm rate 13.2% $P_F=e^{-2}$ at a 3 db (decibel) skim level.

It is reasonable to assume that any subsequent cumulation of hits will be distributed normally with mean $\mu$=np, where $\mu$ is the expected value, and with a standard deviation $\sigma=\sqrt{npq}$ where p is the probability of random noise exceeding the threshold level, which p may be 13.2%, and where q=(1−p). A sample space n of 2048 is selected for the illustrated system when the sample interval is over 8 sweeps. A confidence interval of 95 percent may be utilized such that any cumulation of counts lying in this interval will not be sensed as an error. Based on the 95 percent criteria, the confidence limits are:

$$2\sigma = 2\sqrt{npq} \quad (2)$$

For any measured cumulation of hits or counts, there are infinitely many normal or binomial distributions (with different $\mu$ and $\sigma$) that could contain the count within its confidence limits.

The system in accordance with the principles of the invention utilizes a weighted smoothing operation to adjust the skim level when the count during any sample period is not within the confidence interval for the selected false alarm rate and skim level. The best estimate for correction purposes of the change in the false alarm rate $P_F$ is to find a binomial distribution similar to the reference distribution that includes within the confidence limits, the sample point just measured. Referring to FIG. 1, the reference distribution Ref of a binomial distribution curve 10 is shown relative to a binomial distribution F of a curve 12. The curves 10 and 12 are determined for the sample space n of 2048, a $P_F$ of 13.2% and a 3 db skim level. The curve 12 is selected to be the first distribution that from the lowest count $M_1$, encompasses the reference distribution within its confidence interval. All other distributions are selected in a similar manner. The expected value $\mu$ is at the critical point of the distribution curve 10. To find the distribution of the confidence interval of the curve 10, the relation that the count $M=\mu \pm 2\sigma$ is utilized. The false alarm rate $P_F$ may be found for each count M from:

$$P_F = \frac{1}{n+4}\left[ M + 2 \pm 2\sqrt{1 + M - \frac{M^2}{n}} \right] \quad (3)$$

where M is a measured count and n is the total number of samples. For equation (3) the plus sign is utilized on the high side of the reference distribution while the negative sign is utilized on the low side of the reference distribution. A curve 14 of FIG. 2 is derived from equation (3) and indicates that for various values of M the false alarm rate $P_F$ can be expressed as simple linear equations. The threshold level b at any time may be expressed as:

$$b = \sqrt{\frac{2N}{\ln(P_F)}} \quad (4)$$

where N=the average noise power. After integration over eight sweeps a new threshold $b_{i+1}$ may be expressed as:

$$b_{i+1} = \sqrt{\frac{2N}{\ln(P_{F+1})}} \quad (5)$$

From equations (4) and (5):

$$b_{i+1} = b_i \sqrt{\frac{\ln(P_F)}{\ln(P_{F+1})}} \quad (6)$$

where $b_i=b_R$. From equation (6) $K=b_{i+1}/b_i=b/b_r$. Thus, the correction constant K is a function of the probability of obtaining the reference false alarm rate at the accumulated count to the probability of obtaining the accumulated count. Choosing the center point of each of the selected confidence intervals of the selected distribution curves and the two end points $P_R=0.132$, $P_{low}=0.11$, and $P_{high}=0.16$, $\sqrt{|np|}$ is then calculated. For each $P_F$ at a selected confidence interval, the values $k_{low}$, $K_{ref}$ and $K_{high}$ are determined. Based on the probability of a false alarm rate $P_F$ for various values of count M relative to the expected value $\mu$, curves 16, 18 and 20 are developed for each $b/b_r$ or multiplication constant K. At the expected false alarm rate $\mu$ or between $P_F$ of 0.11 and 0.16, the correction value $b/b_r$ of a dotted curve 21 changes from the $K_{low}$ curve to the $K_{high}$ curve to provide the correction. The reference curve 18 indicates the value of K for a correction to the critical value of the distribution curve 10 (FIG. 1) but the correction is always less than the critical value to provide an overdamped feedback system.

The mechanization of the threshold correction in the system of the invention utilizes binary correction constants of K=¼, ⅛, 1/16, 1/32 and 1/64 based on the count M increments selected from the confidence intervals as discussed above, to provide a reliable correction.

| COUNT M | CONSTANT | OPERATION PERFORMED |
|---|---|---|
| 0–64 | $K_8 = \frac{1}{8}$ | $b_{i+1} = b_i(1 - K_8) = 0.875\, b_i$ |
| 65–160 | $K_{16} = 1/16$ | $b_{i+1} = b_i(1 - K_{16}) = 0.937\, b_i$ |
| 161–216 | $K_{32} = 1/32$ | $b_{i+1} = b_i(1 - K_{32}) = 0.969\, b_i$ |
| 217–240 | $K_{64} = 1/64$ | $b_{i+1} = b_i(1 - K_{64}) = 0.984\, b_i$ |
| 241–304 | $K_0 = 0$ | $b_{i+1} = b_i$ (confidence interval) |
| 305–320 | $K_{64} = 1/64$ | $b_{i+1} = b_i(1 + K_{64}) = 1.02\, b_i$ |
| 321–384 | $K_{32} = 1/32$ | $b_{i+1} = b_i(1 + K_{32}) = 1.03\, b_i$ |
| 385–512 | $K_{16} = 1/16$ | $b_{i+1} = b_i(1 + K_{16}) = 1.06\, b_i$ |
| 513–768 | $K_8 = \frac{1}{8}$ | $b_{i+1} = b_i(1 + K_8) = 1.12\, b_i$ |
| 769–1024 | $K_4 = \frac{1}{4}$ | $b_{i+1} = b_i(1 + K_4) = 1.25\, b_i$ |

In the above table the terms $(1-K_8)$, $(1-K_{16})$, $(1-K_{32})$ and $(1-K_{64})$ represent $b/b_r$ from the curve 16 of FIG. 3 so that correction is always less than the critical value of the reference curve 10 of FIG. 1. Thus for each measured count over the total possible count which is selected as 50 percent of the sample interval of 2048, a false alarm rate $P_F$ and a required correction constant K are calculated. By selecting the reference distribution of the desired false alarm rate, the count increments are determined so that the critical point of each distribution is at a selected confidence interval count from the critical point of the adjacent distribution. To provide a stable feedback loop, the correction constants K only provide a correction at each sample count to the low side of the reference distribution when the threshold level is too high and corrects to the high side of the reference distribution when the threshold level is too low.

Referring now to the schematic block diagram of FIG. 4, the skimmer in accordance with the principles of the invention responds to a video signal of a waveform 20 developed by a radar system 22 which may include a receiver 24, suitable mixing circuits, video detectors and other elements as are well known in the art. When the skimmer system is operating in a surveillance radar system, an antenna 26 may be mounted to a structure 28 for continually rotating 360 degrees through an angle $\theta$. For operation of the skimmer in accordance with the invention with other types of radar or energy reception systems, other types of antennas, signal forming and signal processing arrangements may be utilized such as in conventional scan, search, or track radar systems for either ground based or airborne operation. Also the principles of the invention are applicable to radar systems of coherent and non-coherent types and of pulsed and continuous wave types. A range counter 30 which includes 10 flip flops (Q2301 to Q2310) in the illustrated system responds to clock pulses C and anti-race clock pulses $C_A$ from a clock source 34 to develop a periodic master trigger signal Q2050 of a waveform 36 which is applied to the radar system 22 to initiate a pulse of a waveform 38 for being transmitted from the antenna 26 into space. At the time of transmitting the pulse of the waveform 38, a range sweep is initiated to continue over the period of the return of energy from objects, which period may represent 160 nautical miles, for example. The range counter 30 develops signals representing an 80 mile range and a 160 mile range with the illustrated system being in a "dead" or inactive period between the 160 mile signal and the next master trigger signal, some of these inactive periods being utilized to perform skim level corrections. A sweep counter 40 which may include 12 flip flops Q4101 to Q4112 responds to each master trigger signal to count each radar sweep which is the period of transmission of energy into space and return of reflected energy to the antenna 26. In the illustrated system, the antenna 26 may rotate at 6 revolutions per minute and pulses may be transmitted at a frequency of 360 pulses per second. The two most significant flip flops Q4111 and Q4112 may count the azimuth quadrants for use in correlation and the 10 least significant flip flops may count the 3600 sweeps. Thus, the sweep counter 40 counts 3600 sweeps per 360 degree azimuth scan at which time it is reset to repeat the count on the next scan. Included in the mounting structure 28 is a quadrant signal forming mechanism 43 which at the 90 degree points of rotation of the antenna 26 develops a pulse X4250 for overcoming a jamming condition of the skimmer, as will be explained subsequently.

The signal of the waveform 20 which may be the envelope of the received signal at video frequency is applied from the radar system 22 to an integrator and detector circuit 44 which may include signal chopping circuits, a dual integrator, a differential amplifier and a detecting circuit. The incoming radar video signals are integrated over each range bin interval by one integrator or the other as controlled by the signals from flip flop Q2301 which represents the least significant digit position of the range count. An analog signal, of a negative voltage, representative of the stored digital value of the present skim level is applied from a digital to analog converter 46 through an automatic or manual control circuit 48 to the detection circuit 44 for comparison with the integrated video signal. The difference signal is applied from the difference amplifier circuit of the integrator and detector circuit 44 to a signal shaper circuit 50 which includes gating and pulse stretching circuits. A flip flop Q1032 is reset when a positive difference is applied thereto and is set when the video level does not exceed the stored skim level. The state of the video indication flip flop Q1032 during each range bin interval which represents the quantized video signal is applied to a target detector system 54 which may include statistical determining arrangements for recognizing valid targets and clutter, as are well known in the art. The target detector 54 may respond to range count and sweep count signals as well as to clock signals and may include a memory for storing the video data for each range bin interval over a plurality of range sweeps. For recognizing a clutter condition in space, a counter 56 may count the presence of signals over a selected number of adjacent range bins to set a jamming or clutter indicator flip flop Q2009. Operation of target detectors to recognize the presence of clutter and interference conditions are well known in the art and will not be explained in further detail.

A counter 58 including flip flops Q1001 to Q1010 accumulates the count of the video returns exceeding the skim level or of the hits as determined by the setting of the flip flop Q1032 during each range bin interval. A count is accumulated only when the counter has not overflowed, that is, reached the all "ones" state, the system is not jammed, that is, the flip flop Q2009 is not true and the range count is in the skimmer operating range or between the equivalent of 80 to 160 nautical miles as determined by a signal Q2309 from the range counter 30, which signal is true during this range interval. The counter 58 also performs other functions such as operating during a skim level correction cycle, as will be explained subsequently.

A constant selector flip flop circuit 60 includes flip flops Q1011 to Q1016 which respond to various stages of the count accumulating in the counter 58, and are gated so that the correct flip flop is set at the time a correction cycle is to be performed at the end of the radar sweep or 160 mile point. The setting of the flip flops Q1011 to Q1016 determines the correction constant to be utilized for selecting a new skim level. As will be explained in further detail subsequently, the correction constant controls the parallel shifting of the stored digital skim level in a digilog register 62 to the counter 58 at a selected weighted position prior to serial adding or subtracting of the data in the counter 58 and the stored data in the digilog register. Flip flops Q1021 to Q1030 are included in the digilog register 62 with the flip flop Q1021 through Q1029 functioning as the less significant digits and the flip flop Q1030 effectively functioning as the most significant digit as well as a serial adder. The outputs of flip flops Q1021 through Q1029 are connected to D to A converter 46. The flip flop Q1016 of the constant selector circuit 60 is an add or subtract controlling flip flop and controls the flip flop Q1030 to perform either addition or subtraction to provide the skim level correction.

During the correction cycle which is during radar "dead time" such as after a time representing 160 nautical miles of a selected range sweep, flip flops Q1017 to Q1020 and Q1034 control the operation of the skimmer. The flip flops Q1017 and Q1034 function during jamming conditions and flip flops Q1018, Q1019 and Q1020 control clear, shifting and add or subtract operations. The flip flop Q1018 is set in the absence of an interference or jamming condition, on a selected sweep such as every eighth sweep, for clearing the counter 58 so as to start a correction cycle. Sweep count selection switches 66 including switches S101 to S106, provide selection of a desired number of sweeps such as 4, 8, 16, 32 and 64 for the accumulated sample period before starting a correction cycle. During a jamming condition, flip flop Q1017 is set to prevent Q1018 from being set to effectively maintain the skim level at its previous setting. The skimmer is unlocked by the flip flop Q1034 being set at a quadrant point to force a "one" into the register 62 and effectively reset the skimmer.

The flip flop Q1019 is set true for one clock period or bit time following the setting of the flip flop Q1018 to enable the parallel shifting of the data in the register 62 into the counter 58 effectively multiplied by the proper correction constant. The flip flop Q1020 is then set for 10 clock periods or bit times to enable the serial shifting and recirculation of the contents of the register 62 and the serial shifting of the contents of the counter 58 to the add-subtract flip flop Q1030. A carry-borrow flip flop Q1031 is utilized in the addition or subtraction operation.

Figure 5:
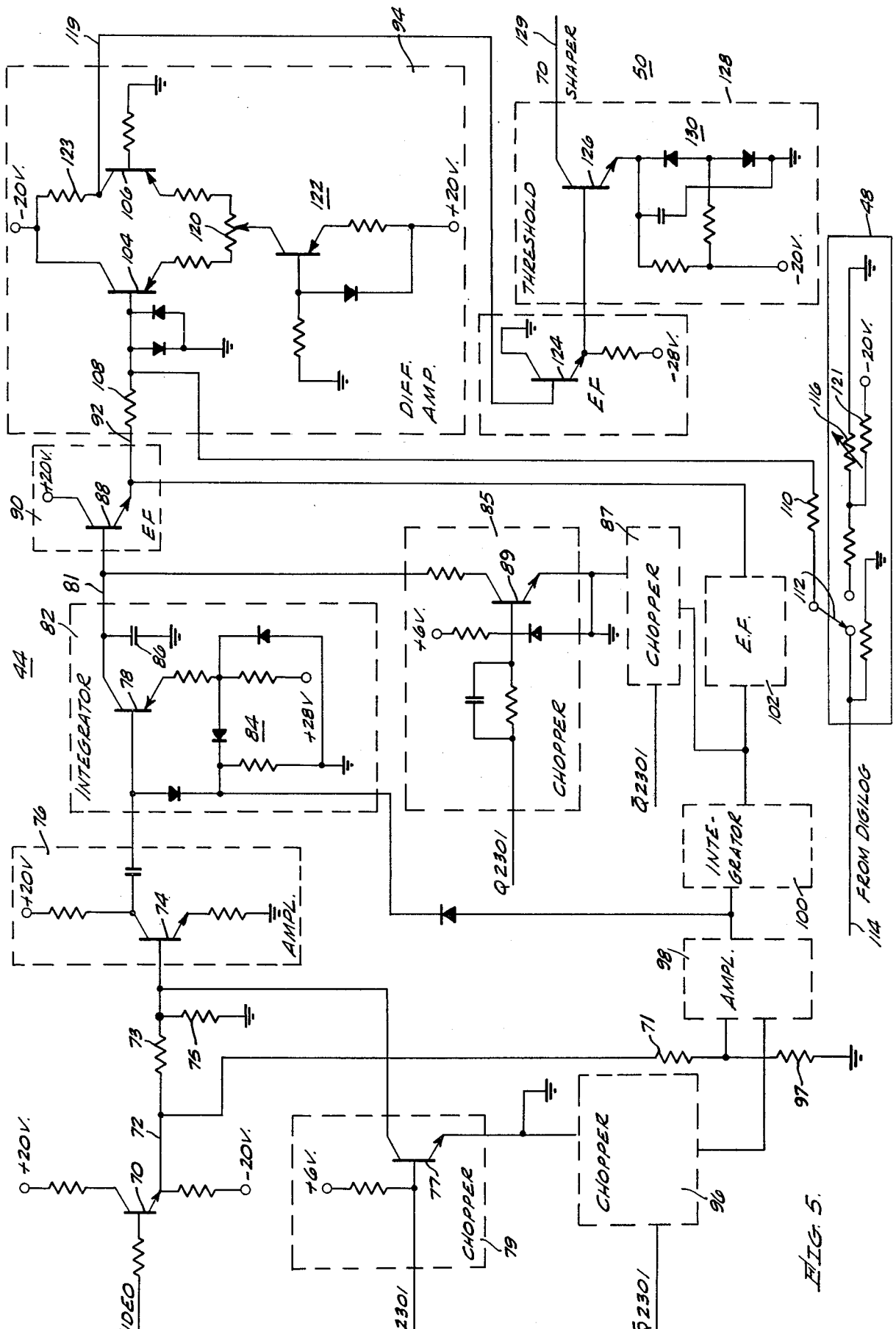
FIG. 5 is a schematic circuit and block diagram of the integrator difference amplifier and detector circuits of FIG. 4.

Referring now to FIG. 5 showing the integrator and detector circuit 44, the video signal is applied to the base of an npn type transistor 70 functioning as an emitter follower to apply a signal to a lead 72 and through a resistor 73 to the base of an npn type transistor 74 of an amplifier 76 of a first integration path. A signal amplitude dividing resistor 75 is coupled between the base of the transistor 74 and ground. An npn type transistor 77 of a chopper circuit 79 responds at its base to a signal Q2301 from the least significant bit position of the range counter 30 (FIG. 4) to be biased into conduction at alternate clock periods and prevent a signal from passing through the amplifier 76. The amplified video signal is applied from the collector of the transistor 74 to the base of pnp type transistor 78 of a first integrator 82. A clamping circuit 84 is coupled to the emitter and base of the transistor 78, and the collector is coupled through a charging capacitor 86 to ground. The collector of the transistor 78 is also coupled through a lead 81 to the base of a transistor 88 of an emitter follower circuit 90. The collector of the transistor 88 may be coupled to a suitable source of potential such as +20 volts and the emitter is coupled to a lead 92 which applies the integrated video signal through a resistor 108 to a differential amplifier circuit 94.

The second integration path includes a chopper circuit 96 responsive to the signal $\overline{Q2301}$ to alternately gate an amplifier 98 to pass video signals appearing on the lead 72. A signal dividing network including a resistor 71 in the input lead and a resistor 97 coupled to ground is provided at the amplifier 98. An integrator 100 responds to video signals passed through the amplifier 98 to apply integrated signals to an emitter follower circuit 102, which in turn applies the signal to the lead 92. A chopper circuit 85 includes an npn type transistor 89 having a collector coupled to the lead 79 and a base responsive to the signal Q2301 to discharge the capacitor 86 when the integrator 100 is being charged. A similar chopper circuit 87 responds to the signal $\overline{Q2301}$ to alternately discharge the storage capacitor of the integrator 100. Thus one of the integrator paths responds to the video signal while the integrator of the other path is discharging.

The differential amplifier circuit 94 includes pnp type transistors 104 and 106 with the base of the transistor 104 coupled through the resistor 108 to the lead 92 as well as through a resistor 110 to the automatic-manual control circuit 48. A switch 112 couples the resistor 110 to a lead 114 for receiving the digilog signal from the converter 46 (FIG. 4) during skimmer feedback operation and couples the resistor 110 to a selected skimmer voltage during manual operation. A variable resistor 116 and a resistor 121 are coupled between ground and a suitable source of potential such as −20 volts to apply the selected manual skim voltage to the differential amplifier 94. The collector of the transistor 104 is coupled to a suitable source of potential such as −20 volts and the collector of the transistor 106 is coupled through a load resistor 123 to the −20 volt source. The emitters of the transistors 104 and 106 are coupled through suitable resistors to a tapped resistor 120 which has an adjustable tap coupled to a suitable constant current source 122.

The difference amplifier circuit 94 is followed by an emitter follower transistor 124 of the npn type and responsive at its base to the differential signal on a lead 119 at the collector of the transistor 106. The differential signal is applied from the emitter of the transistor 124 to the base of an npn type transistor 126 of a threshold sensing circuit 128. The collector of the transistor 126 is normally positive and it swings toward −15.5 volts as derived from a biasing circuit 130 at the emitter of that transistor when biased into conduction. This condition on a lead 129 which is coupled to the collector of the transistor 126, indicates that the integrated video signal on the lead 92 exceeds the digilog voltage on the lead 114 by a predetermined amount and is a video "hit" condition for that range bin interval.

Figure 6:
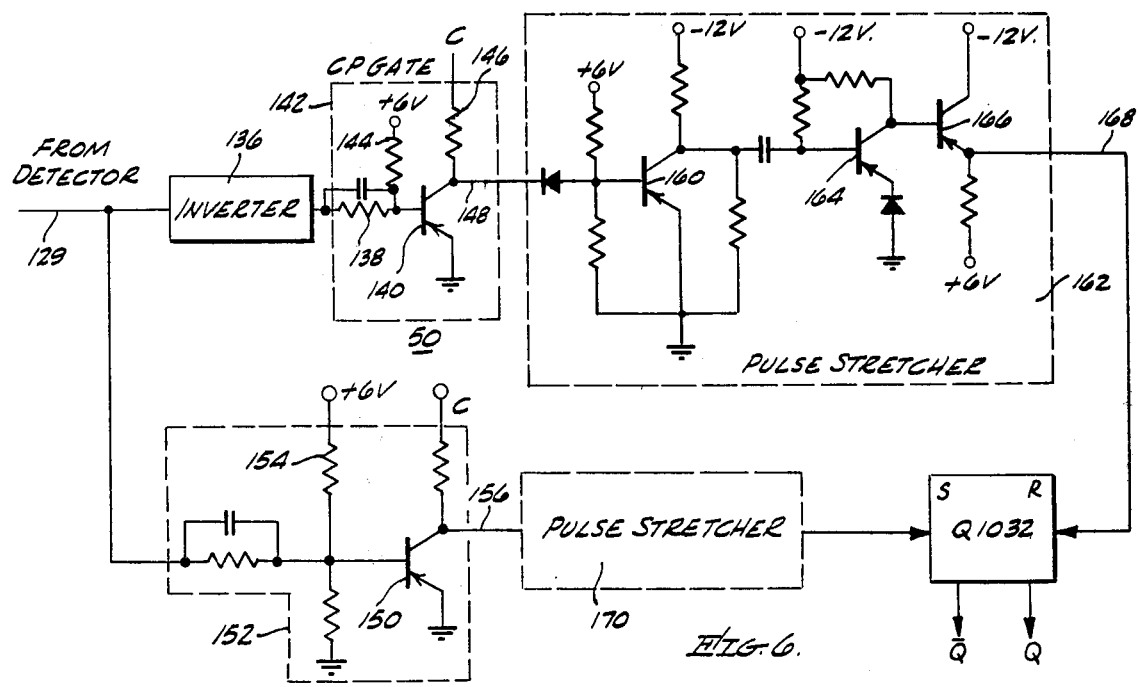
FIG. 6 is a schematic circuit and block diagram of the signal shaping circuits of FIG. 4.

Referring now to FIG. 6, the signal shaping circuit 50 includes an inverter 136 responsive to the signal on the lead 129 to apply an inverted signal through a resistor 138 to the base of a pnp type transistor 140 of a clock pulse gate 142, which is effectively the input gate of the flip flop Q1032. The base of the transistor 140 is coupled through a resistor 144 to a suitable source of potential such as a +6 volt terminal, the emitter is coupled to ground and the collector is coupled through a resistor 146 to the clock 34 (FIG. 4) to respond to clock pulses C. The lead 129 is also coupled directly to the base of a pnp type transistor 150 of a clock pulse gate 152 similar to the gate 142. If the detected signal on the lead 129 is at ground level indicating the absence of a video signal, clock pulses will be applied to a lead 156 and if the detected signal is at a negative potential, the clock pulses will be applied to a lead 148. The lead 148 is coupled to the base of a pnp type transistor 160 of a pulse stretching circuit 162 which in combination with a pnp type transistor 164 provides pulse shaping and stretching of the clock pulse applied to the lead 148. Suitable biasing arrangements are provided and the collector of the transistor 164 is coupled to the base of a pnp type transistor 166 functioning as an emitter follower to apply a reset pulse through a lead 168 to the flip flop Q1032. A pulse stretcher circuit 170 similar to the pulse stretcher 162 is coupled between the lead 156 and the set terminal of the flip flop Q1032 for setting that flip flop in the presence of a video signal exceeding the skim level. The transistors of the circuits of FIGS. 5 and 6 are suitably biased as indicated to form the required integrating and detecting function.

To further explain the operation of the integrator, difference amplifier, threshold detector and pulse shaping circuits of FIGS. 5 and 6, the video input signal is applied to the emitter follower transistor 70 and then to the amplifiers 76 and 98 where the signals are attenuated by a factor of one half in resistors 73 and 75 and resistors 71 and 97. The amplifiers 76 and 98 may each have unity gain and the output is applied to the integrators 82 or 100 depending on whether signals Q2301 or $\overline{Q2301}$ are respectively at a true level (−5 volts). The emitter of the integrator transistor such as 78 is maintained at approximately +18 volts while the base is biased at +17.5 volts. Any negative going signal from the amplifier biases the transistor 78 or the similar transistor in the integrator 100 into conduction and enables the integrating capacitor 86 or similar capacitor in the integrator 100 to change to approximately one half of the video input voltage level. For controlling the alternate charging or discharging of the integrators 82 and 100, transistors 77 and 88 are biased out of conduction to allow the capacitor 86 to be charged while the integrator 100 is discharged and similar transistors in the choppers 96 and 87 are biased out of conduction to allow the integrating capacitor in the integrator 100 to charge while the integrator 82 is discharged. The transistors 77 and 88 or the transistors of the choppers 96 and 87 are biased fully on or fully off during alternate range counts of a selected range bin interval of 625 yards in the illustrated system. The signals developed by the integrators 82 or 100 are applied to the difference amplifier 94 which senses when the integrated voltage on the lead 92 exceeds the digilog input voltage on the lead 114 by more than 80 millivolts, for example. The transistor 106 is biased out of conduction in the absence of a signal of a sufficient positive amplitude at the base of the transistor 104. The bias potential on the collector of the transistor 106 is normally −16 volts and the bias potential on the emitter of transistor 126 is −15.5 volts. When the signal at the base of the transistor 104 is more than 80 millivolts positive, the voltage on the collector of transistor 106 swings positive toward −15 volts which biases the transistor 126 into conduction. The voltage on the collector of the transistor 126 is normally slightly positive and it swings toward −15.5 volts when that transistor is biased into conduction indicating that the integrated video signal has exceeded the skim level by the required amount. The switch 112 provides manual selection of a desired skim level.

The signal on the lead 129 is sensed by transistors 140 and 150 and when that signal is at ground potential, indicating that the integrated video signal does not exceed the skim level by the selected amount, clock pulses are applied to the lead 156 and through the pulse stretching circuit 170 to set the flip flop Q1032. If the signal on the lead 129 is at a negative potential indicating that the integrated voltage for that range bin exceeds the skim level voltage, clock pulses are applied to the lead 148 and through the pulse stretcher 162 to reset the flip flop Q1032. An inverter amplifier is utilized in the flip flop Q1032 so that in the set state, the true output terminal is false and the false output terminal is true. Thus the flip flop Q1032 provides a true signal at its true output terminal when the integrated video signal for a range bin exceeds the skim level to be consistent with the illustrated system logic.

Figure 8:
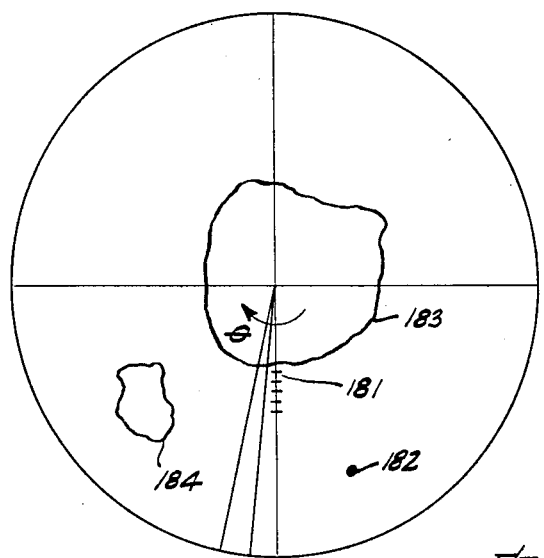
FIG. 8 is a schematic diagram showing a plan of the radar surveillance area over which the skimmer system of FIG. 4 may respond when utilized in a surveillance type radar system.
Figure 7:
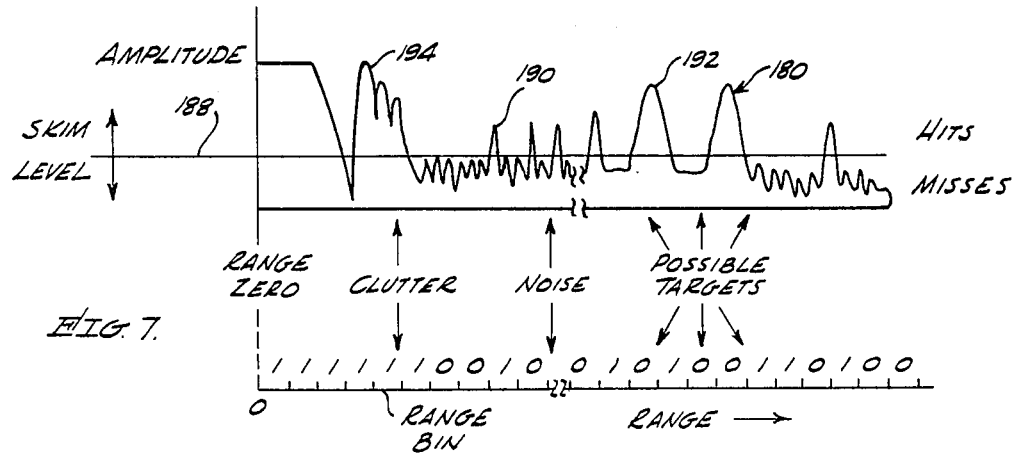
FIG. 7 is a schematic diagram showing the video return signals during a radar sweep period for explaining the types of signals that may be applied to the video skimmer system of FIG. 4.

Referring now to FIGS. 7 and 8, a waveform 180 indicates the amplitude or power level of a typical video signal developed over a plurality of range bin intervals as defined by the range counter 30 of FIG. 4 and during a single sweep period. As indicated by the plan view of FIG. 8 which shows 160 miles of radar surveillance area, the radar sweeps are repeated at the master trigger pulse repetition frequency as the antenna rotates through the angle θ. The range counter counts each range interval or range bin interval such as 181 during each of the periods between master trigger pulses which not only includes the period during which energy is being received from objects to 160 miles in range but a "dead time" or inactive period. As ground clutter 183 may appear during the first range portion of each sweep, the skim level in the system of the invention is only controlled in response to returns received from objects or conditions between the 80 and 160 mile ranges. Radar returns may be received from objects such as 182 or from regions of clutter such as 184. The noise signals of the waveform 180 may be from any of a plurality of sources such as interference energy received in space, target noise, antenna noise or noise developed in the radar system. Although the criteria for setting the skim level is the average noise power sensed in a range bin, the relatively small number of target returns has a statistically negligible effect on maintaining the skim level when correcting the skim level after a selected number of radar sweep periods.

A skim level 188 of FIG. 7 allows detection as hits and misses of the noise signals such as 190 and the target signals such as 192 as well as clutter return signals such as 194. The feedback loop of the system in accordance with the invention maintains the skim level 188 to provide a substantially constant false alarm rate or percentage of noise signals erroneously detected as target signals. In the illustrated system, a 3 db (decibel) skim level, that is a power or voltage ratio of the skim level over the RMS noise, may be provided. Although the clutter signals 194 are shown as ground return clutter, clutter regions such as 184 of FIG. 8, jamming signals or interference signals may be sensed between the 80 to 160 mile ranges and the skimmer functions, in accordance with the principles of the invention, so that the skim level is not erroneously changed, as will be explained subsequently. The digital numbers of FIG. 7 indicate the setting of the flip flop Q1032 at each range bin interval which is the quantized video signal.

Figure 9:
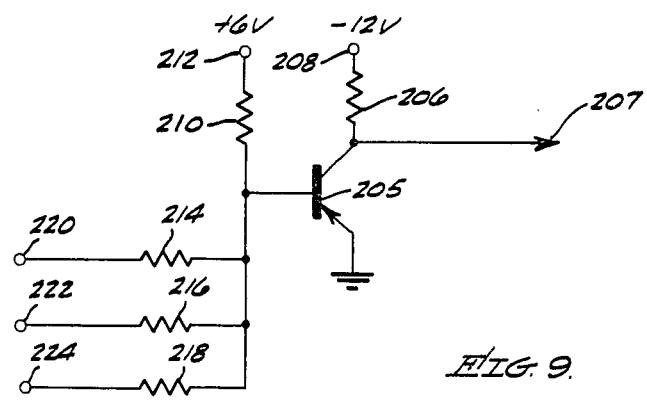
FIG. 9 is a schematic circuit diagram of a NOR (negative "or") gate as an example of one type of logical gate that may be utilized in the system of the invention.
Figure 10:
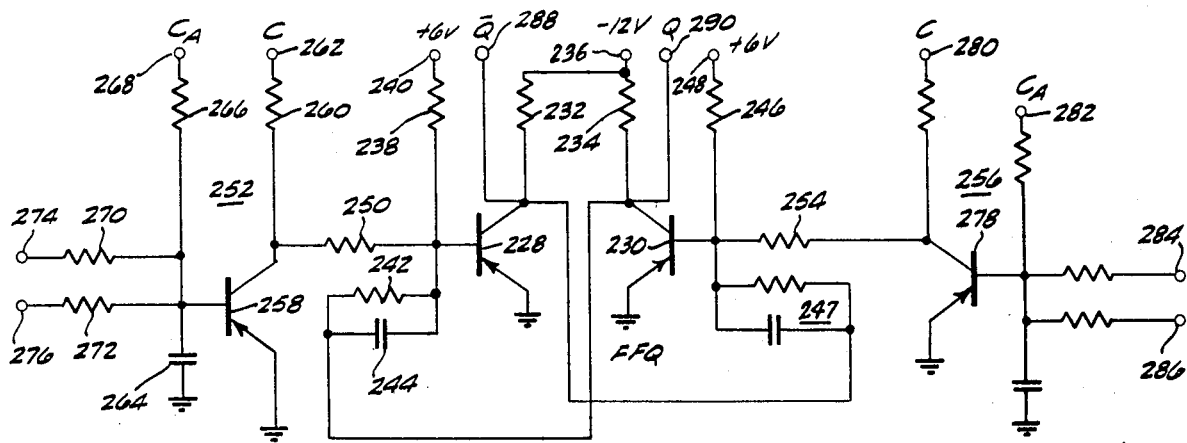
FIG. 10 is a schematic circuit diagram of one type of flip flop that may be utilized in the system of the invention.

Before further explaining the system of FIG. 4, reference is made to FIGS. 9 and 10 for explaining a typical NOR (negative "or") gate and a flip flop or bistable element that may be utilized in the system of the invention. It is to be understood that the system in accordance with the principles of the invention is not to be limited to any particular type of logical structure and may be operated with either NOR or NAND (negative "and") inverter logic, conventional diode logic or with any type of appropriate logical arrangement. Also the principles of the invention are not to be limited to any type of flip flops or data storage elements and any suitable arrangement may be utilized within the principles of the invention. The logical voltage levels are selected in the illustrated system as 0 volts for the false level and as −5 volts to approximately −7 volts for the true level. However, it is to be understood that any desired logical levels and relative polarity of the true and false levels may be utilized within the scope of the invention. The NOR gate of FIG. 9 includes a pnp type transistor 205 having an emitter coupled to ground and a collector coupled through a resistor 206 to a suitable source of potential such as a −12 volt terminal 208. The base of the transistor 205 is coupled through a resistor 210 to a +6 volt terminal 212 as well as through resistors 214, 216 and 218 to respective input terminals 220, 222 and 224. As a NOR gate develops a false output signal if any of the input signals are at a true level and develops a true output signal when all of the input signals are at false levels, a true signal of −5 volts applied to any or any number of the input terminals 220, 222 or 224 biases the transistor 205 into conduction to apply a signal to an output terminal 207 at the collector thereof at approximately ground potential or at a false level. When the signals applied to all of the input terminals 220, 222 and 224 are at false or ground levels, the transistor 205 is biased out of conduction and approximately −5 volts or a true level is applied to the output terminal 207. Depending upon the load connected to the terminal 207, the true voltage level may vary between −5 volts and −12 volts, although the true level is normally −5 volts. It is to be understood that the gate of FIG. 9 may be provided with any desired number of input terminals. The NOR gate of FIG. 9 may be utilized either as an "or" gate or as an "and" gate. When functioning as an "or" gate, false signals are maintained at the input terminals such as 220, 222 and 224 to maintain a true output level, and any of the input signals going to a true level provides a false level at the output terminal. When functioning as an "and" gate, all of the input signals are maintained at true levels and all of the input signals changing to false levels develop a true output signal. For purposes of illustration a NOR gate functioning as an "or" gate is shown by a symbol with a curved input surface such as a gate 318 of FIG. 11 and a NOR gate functioning as an "and" gate is shown with a linear input surface such as a gate 300 of FIG. 11. When NOR gates are utilized as inverters they are considered to perform an "and" function when preceding a gate functioning as an "or" gate and to perfom an "or" function when preceding a gate functioning as an "and" gate or preceding the "and" gate in the illustrated flip flop.

The flip flop FFQ of FIG. 10 includes pnp type transistors 228 and 230 each having an emitter coupled to ground and a collector coupled through respective resistors 232 and 234 to a −12 volt terminal 236. The base of the transistor 228 is coupled through a resistor 238 to a +6 volt terminal 240 as well as through a cross coupling resistor 242 and capacitor 244 to the collector of the transistor 230. The base of the transistor 230 is coupled through a resistor 246 to a +6 volt terminal 248 as well as through a cross coupling resistor and a capacitor 247 to the collector of the transistor 228. The base of the transistor 228 is also coupled through a resistor 250 to a gate 252 and the base of the transistor 230 is coupled through a resistor 254 to a gate 256, both gates functioning as "and" gates. The gate 252 includes a pnp type transistor 258 having an emitter coupled to ground and a collector coupled through a resistor 260 to a clock pulse terminal 262. The base of the transistor 258 is coupled to ground through a by-pass capacitor 264, is coupled through a resistor 266 to an anti-race clock pulse terminal 268 and is coupled through resistors 270 and 272 to respective set input terminals 274 and 276. The gate 256 is similar to the gate 252 having a pnp type transistor 278, a clock pulse terminal 280, an anti-race clock pulse terminal 282 and input terminals 284 and 286. The output signals from the flip flop FFQ are $\overline{Q}$ and Q which are applied to respectively false and true terminals 288 and 290 from the collectors of respective transistors 228 and 230. It is to be noted that the flip flop Q1032 of FIG. 6 may be similar to the flip flop of FIG. 10 except that the gates 142 and 152 corresponding to gates 252 and 256 are coupled through pulse stretching circuits to the bistable portion of the transistors 228 and 230. As previously discussed, inverter amplifiers are coupled to the output terminals 288 and 290 in the flip flop Q1032.

In operation, a true input signal at −5 volts applied to any of the input terminals 220, 222 and 224 of the NOR gate of FIG. 9 applies a false or 0 volt pulse to the terminal 207 which may be connected to the terminal 274 of the gate 252 functioning as an "and" gate. If the terminal 276 is at a false level, either from a potential source or from a logical term, the transistor 258 is biased out of conduction. When a negative clock pulse is applied to the terminal 262, the transistor 228 is biased into conduction to apply a ground potential or a false level to the false output terminal 288 in which condition the flip flop is set or in the "one" state. At the same time, ground potential is applied through the cross coupling capacitor 244 to bias the transistor 230 out of conduction if the flip flop was previously in the "zero" state and to apply a true signal level to the terminal 290. In a similar manner, the flip flop is reset to the "zero" state in response to a false signal applied to both of the terminals 284 and 286 and clock pulses C and $C_A$ applied to the respective terminals 280 and 282. The anti-race clock pulse $C_A$ applied to the terminals 268 and 282 is a negative pulse falling from a normal level of +6 volts to −2 volts to prevent the transistor 258 or 278 from being biased out of conduction until the capacitor 264 or similar capacitor in the gate 256 is discharged. Thus the flip flop has an anti-race feature allowing information to be read from output terminals 288 and 290 before changing state.

Referring now to FIGS. 11 to 18 which show the flip flops Q1001 to Q1010 that perform the function of counting the video signals detected during each range bin interval as exceeding the skim level as determined by the state of flip flop Q1032. It is to be noted that the counter also performs a shifting function as will be explained subsequently. The partial logic for setting and resetting each flip flop of the counter as utilized for the counting operation is as follows, in which the dotted portions indicate that other logic is also utilized:

$S1001 = S2101-02(\overline{Q}1001.\overline{Q}2009.X1106 + \ldots )C.$ $R1001 = (Q1001.\overline{Q}2009.X1110 + \ldots )C.$ $S1002 = S2101-02(Q1001.\overline{Q}1002.X1106 + \ldots )C.$ $R1002 = (Q1001.Q1002.X1110 + \ldots )C.$ $S1003 = S2101-02(Q1001.Q1002.\overline{Q}1003.X1106 + \ldots )C.$ $R1003 = (Q1001.Q1002.Q1003.X1110 + \ldots )C.$ $S1004 = S2101-02(Q1001.Q1002.Q1003.\overline{Q}1004.X1106 + \ldots )C.$ $R1004 = (Q1001.Q1002.Q1003.Q1004.X1110 + \ldots )C.$ $S1005 = S2101-02(Q1001.Q1002.Q1003.Q1004.\overline{Q}1005.X1106 + \ldots )C.$ $R1005 = (X1107.X1110 + \ldots )C.$ $S1006 = S2101-02(\overline{Q}1006.X1107.X1106 + \ldots )C.$ $R1006 = (Q1006.X1107.X1110 + \ldots )C.$ $S1007 = S2101-02(Q1006.\overline{Q}1007.X1107.X1106 + \ldots )C.$ $R1007 = (Q1006.Q1007.X1107.X1106 + \ldots )C.$ $S1008 = S2101-02(Q1006.Q1007.\overline{Q}1008.X1107.X1106 + \ldots )C.$ $R1008 = (X1107.X1108.X1110 + \ldots )C.$ $S1009 = S2101-02(\overline{Q}1009.X1107.X1108.X1106 + \ldots )C.$ $R1009 = (Q1009.X1107.X1108.X1110 + \ldots )C.$ $S1010 = S2101-02.Q1009.\overline{Q}1010.X1107.X1108.X1106C.$ $R1010 = (Q1009.Q1010.X1107.X1108.X1110 + \ldots )C.$ For improved clarity of explanation logical gates X1107 and X1108 are included in the above equations and may be expressed as:

$X1107 = Q1001.Q1002.Q1003.Q1004.Q1005.$ $X1108 = Q1006.Q1007.Q1008.$

The counter 58 which is a Mod 1024 counter in the illustrated system only counts video return signals when the counter has not overflowed, the system is not jammed and when the range count is between 80 and 160 miles. The jam indicator flip flop Q1017 is set when the counter changes to the all "ones" state and when the system is jammed, as will be explained subsequently. A signal Q2309 from the range counter 30 is true when the range count is between the values representing 80 and 160 mile range. A logical gate X1106 controls the counting operation and may be expressed as:

$X1106 = \overline{Q}1017.Q1032.Q2309.$

The setting of flip flop Q1018 clears the Mod 1024 counter in preparation for the correction cycle. The counter is also reset by the master clear signal S2101-01 or an end of comparison sweep signal X1120. The counter reset term X1109 may be expressed as:

$X1109 = Q1018 + S2101-01 + X1120.$

The counter logic is of a conventional type for a ten stage counter. As the counter is cleared by the master clear signal S2101-01, the inverted master clear signal S2101-02 is "anded" with all of the set terms of the counter flip flops. The master clear signal S2101-01 is normally at a false level and changes to a true level during master clear.

Another function of the counter 58 is to parallel shift the contents of the digilog register (Q1021-Q1030) into the counter in one bit time to a position determined by the correction constant of the constant selector flip flop circuit 60. The following table shows into which counter flip flops the information is shifted based upon the selected constant.

| Register Flip Flop | Constant | | | | |
|---|---|---|---|---|---|
| | ¼ | ⅛ | 1/16 | 1/32 | 1/64 |
| Q1030 shifted to | Q1008 | Q1007 | Q1006 | Q1005 | Q1004 |
| Q1029 shifted to | Q1007 | Q1006 | Q1005 | Q1004 | Q1003 |
| Q1028 shifted to | Q1006 | Q1005 | Q1004 | Q1003 | Q1002 |
| Q1027 shifted to | Q1005 | Q1004 | Q1003 | Q1002 | Q1001 |
| Q1026 shifted to | Q1004 | Q1003 | Q1002 | Q1001 | — |
| Q1025 shifted to | Q1003 | Q1002 | Q1001 | — | — |
| Q1024 shifted to | Q1002 | Q1001 | — | — | — |
| Q1023 shifted to | Q1001 | — | — | — | — |
| Q1022 shifted to | — | — | — | — | — |
| Q1021 shifted to | — | — | — | — | — |

The partial logic for the Mod 1024 counter during this parallel shifting phase of the cycle is:

$S1001 = S2101-02(Q1023.X1101 + Q1024.X1105 + Q1025.X1104 + Q1026.X1103 + Q1027.X1102 + \ldots )C.$ $S1002 = S2101-02(Q1024.X1101 + Q1025.X1105 + Q1026.X1104 + Q1028.X1102 + Q1027.X1103 + \ldots )C.$ $S1003 = S2101-02(Q1025.X1101 + Q1026.X1105 + Q1027.X1104 + Q1028.X1103 + Q1029.X1102 + \ldots )C.$ $S1004 = S2101-02(Q1026.X1101 + Q1027.X1105 + Q1028.X1104 + Q1029.X1103 + Q1030.X1102 + \ldots )C.$ $S1005 = S2101-02(Q1027.X1101 + Q1028.X1105 + Q1029.X1104 + Q1030.X1103 + \ldots )C.$ $S1006 = S2101-02(Q1028.X1101 + Q1029.X1105 + Q1030.X1104 + \ldots )C.$ $S1007 = S2101-02(Q1029.X1101 + Q1030.X1105 + \ldots )C.$ $S1008 = S2101-02(Q1030.X1101 + \ldots )C.$ Gates X1101 to X1105 control this parallel shifting operation.

$$X1101 = Q1015.Q1016.Q1019$$

$$X1102 = Q1014.Q1019$$

$$X1103 = Q1013.Q1019$$

$$X1104 = Q1012.Q1019$$

$$X1105 = Q1011.Q1019$$

The dotted portions of the above and subsequent equations represent other logical expressions that may also be utilized to set and reset the flip flops. It is to be again noted that flip flop Q1018 is set to clear the counter 58 preparatory to the correction cycle and the flip flop Q1019 is set to the true state for one bit time following the setting of Q1018 to enable the parallel shifting of the digilog register data into the counter 58.

At the next clock time after flip flop Q1019 is set, the flip flop Q1020 is set for ten clock periods for serial shifting of the data in the counter 58 from the flip flop Q1001 of the least significant position and the contents of the digilog register 62 from the flip flop Q1021 in the least significant position to the serial adder flip flop Q1030. After the ten shift periods the sum or the difference is maintained in the digilog register 62. The shifting logic for the Mod 1024 counter 58 during which the contents are not recirculated is as follows:

$$S1001 = S2101\text{-}02(Q1002.Q1020 + \ldots)C.$$

$$R1001 = (\overline{Q}1002.Q1020 + \ldots)C.$$

$$S1002 = S2101\text{-}02(Q1003.Q1020 + \ldots)C.$$

$$R1002 = (\overline{Q}1003.Q1020 + \ldots)C.$$

$$S1003 = S2101\text{-}02(Q1004.Q1020 + \ldots)C.$$

$$R1003 = (\overline{Q}1004.Q1020 + \ldots)C.$$

$$S1004 = S2101\text{-}02(Q1005.Q1020 + \ldots)C.$$

$$R1004 = (\overline{Q}1005.Q1020 + \ldots)C.$$

$$S1005 = S2101\text{-}02(Q1006.Q1020 + \ldots)C.$$

$$R1005 = (\overline{Q}1006.Q1020 + \ldots)C.$$

$$S1006 = S2101\text{-}02(Q1007.Q1020 + \ldots)C.$$

$$R1006 = (\overline{Q}1007.Q1020 + \ldots)C.$$

$$S1007 = S2101\text{-}02(Q1008.Q1020 + \ldots)C.$$

$$R1007 = (\overline{Q}1008.Q1020 + \ldots)C.$$

$$S1008 = S2101\text{-}02(Q1009.Q1020 + \ldots)C.$$

$$R1008 = (\overline{Q}1009.Q1020 + \ldots)C.$$

$$S1009 = S2101\text{-}02(Q1010.Q1020 + \ldots)C.$$

$$R1009 = (\overline{Q}1010.Q1020 + \ldots)C.$$

Figure 11:
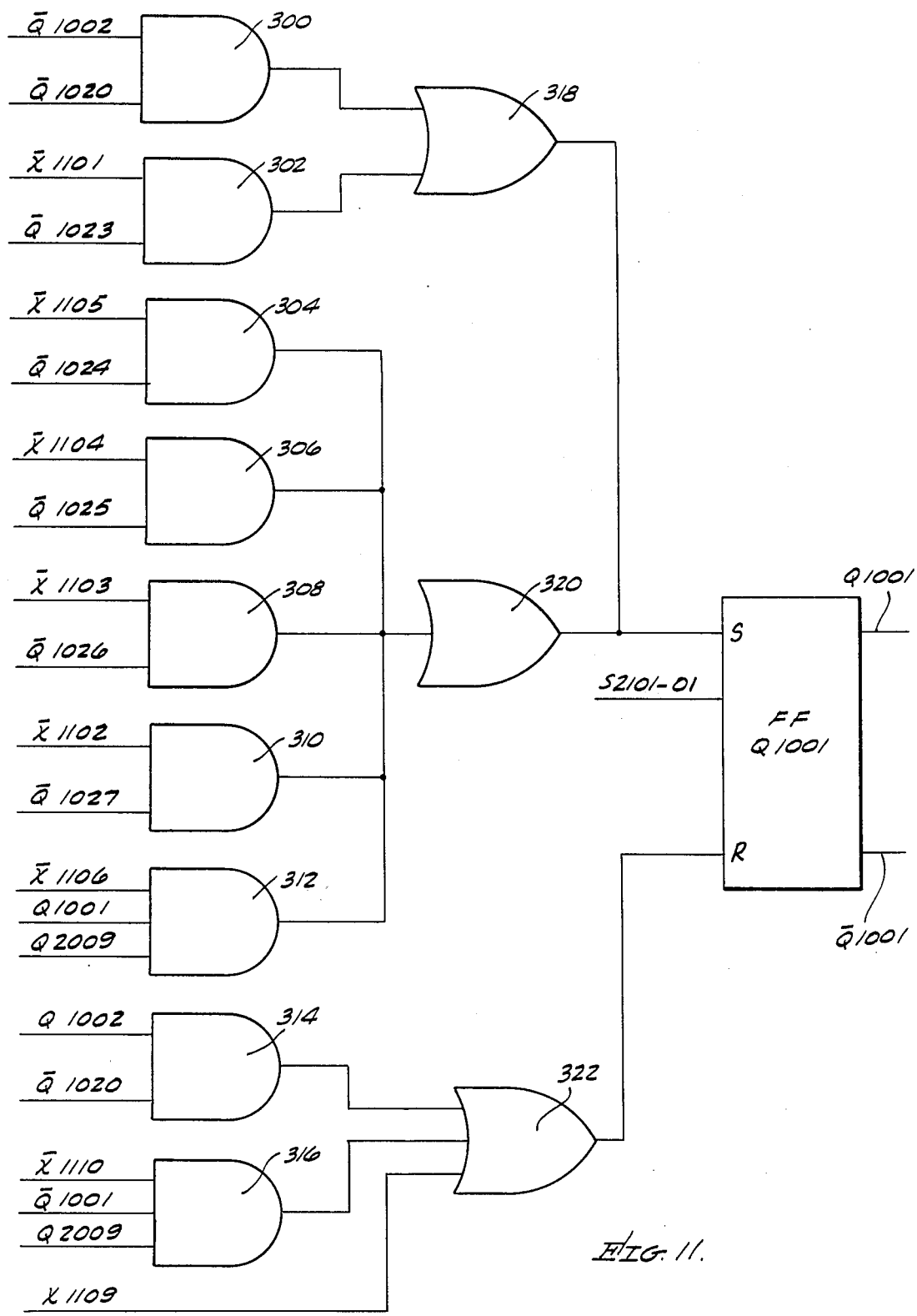
FIG. 11 is a schematic circuit and block diagram of the flip flop Q1001 utilized in the least significant bit position of the target signal or hit counter of FIG. 4.

The flip flop Q1001 of FIG. 11 is set when S2101-01 is false during serial shifting by a NOR gate 300, during parallel shifting by NOR gates 302, 304, 306, 308 or 310 and during counting by a NOR gate 312, all of the gates functioning as "and" gates. The flip flop Q1001 is reset during serial shifting by a NOR gate 314 and during counting by a NOR gate 316, the gates functioning as "and" gates. A NOR gate 318 functioning as an "or" gate responds to gates 300 and 302 to apply a set term to the flip flop Q1001 and a NOR gate 320 functioning as an "or" gate responds to gates 304, 306, 308, 310 and 312 to apply a set term to the flip flop. A NOR gate 322 functioning as an "or" gate responds to gates 314 and 316 and to the reset term X1109 to apply a reset signal to the flip flop Q1001. The gates 300 and 302 respectively respond to terms $\overline{Q}1002$ and $\overline{Q}1020$ and to terms $\overline{X}1101$ and $\overline{Q}1023$. The gates 304, 306, 308, 310 and 312 respectively respond to terms $\overline{X}1105$ and $\overline{Q}1024$, to terms $\overline{X}1104$ and $\overline{Q}1025$, to terms $\overline{X}1103$ and $\overline{Q}1026$, to terms $\overline{X}1102$ and $\overline{Q}1027$ and to terms $\overline{X}1106$, Q1001 and Q2009. The gates 314 and 316 respectively respond to terms Q1002 and $\overline{Q}1020$ and to terms $\overline{X}1110$, $\overline{Q}1001$ and Q2009.

Figure 12:
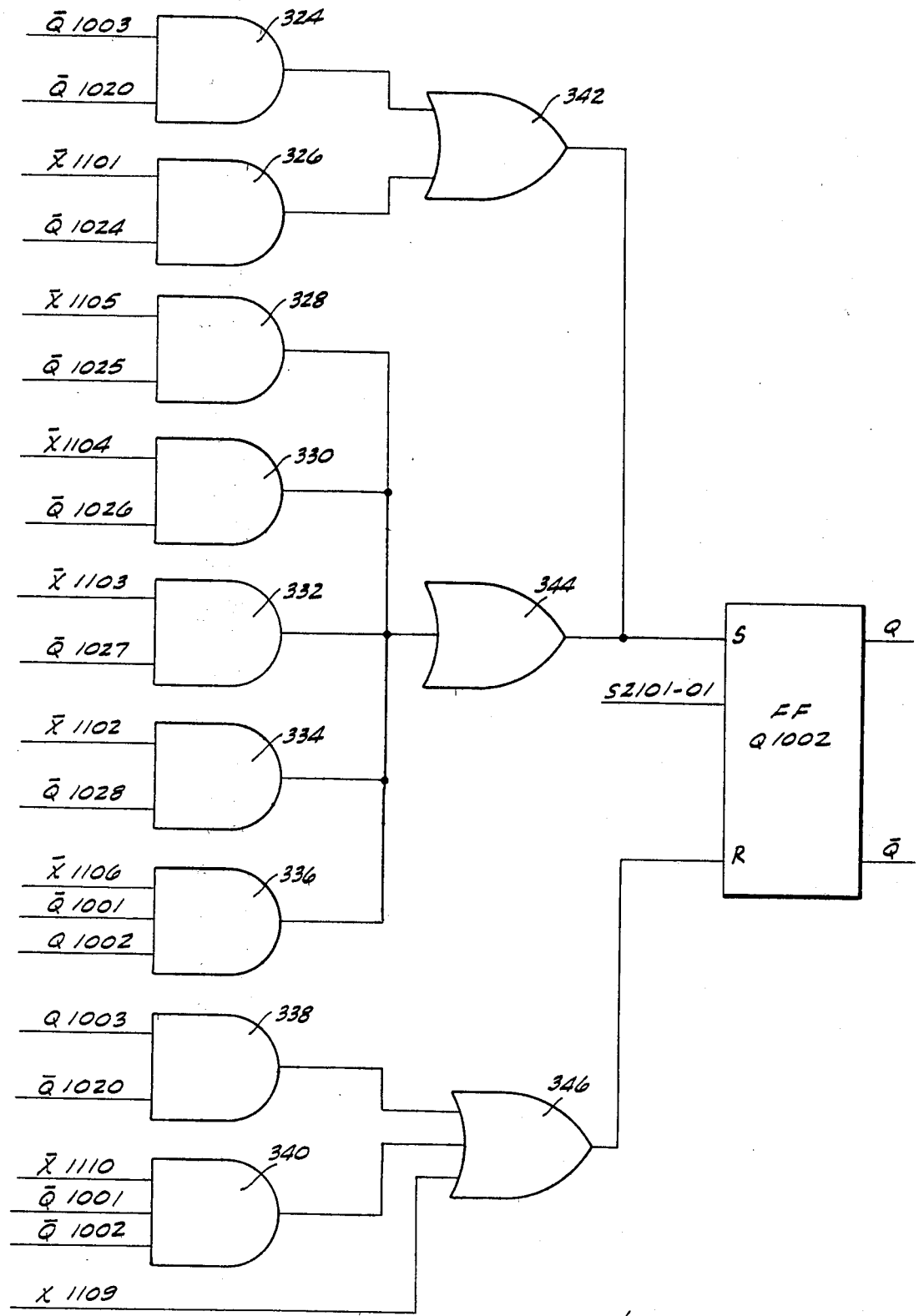
FIG. 12 is a schematic circuit and block diagram of the flip flop Q1002 utilized in the counter of FIG. 4.
Figure 13:
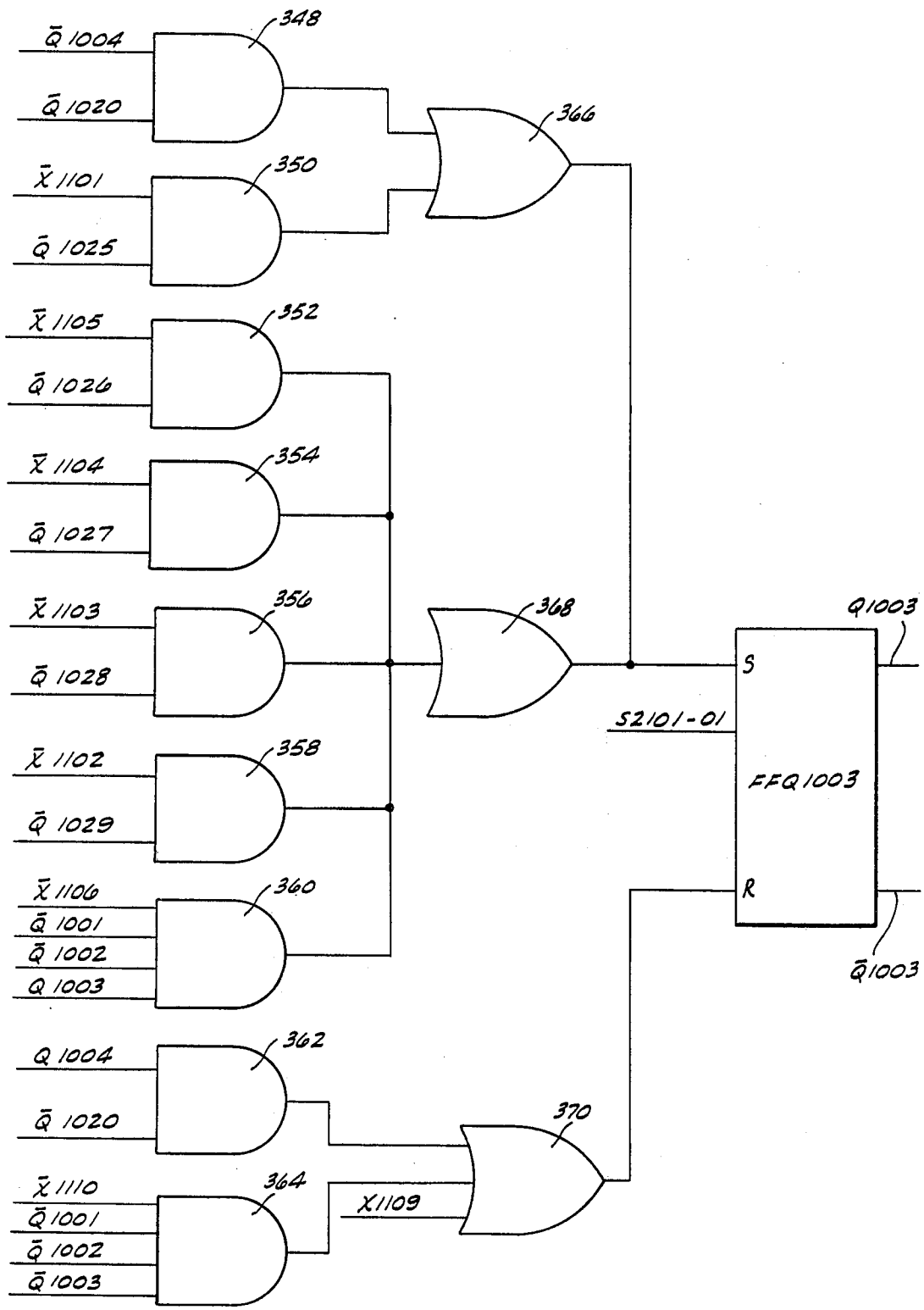
FIG. 13 is a schematic circuit and block diagram of the flip flop Q1003 utilized in the counter of FIG. 4.
Figure 14:
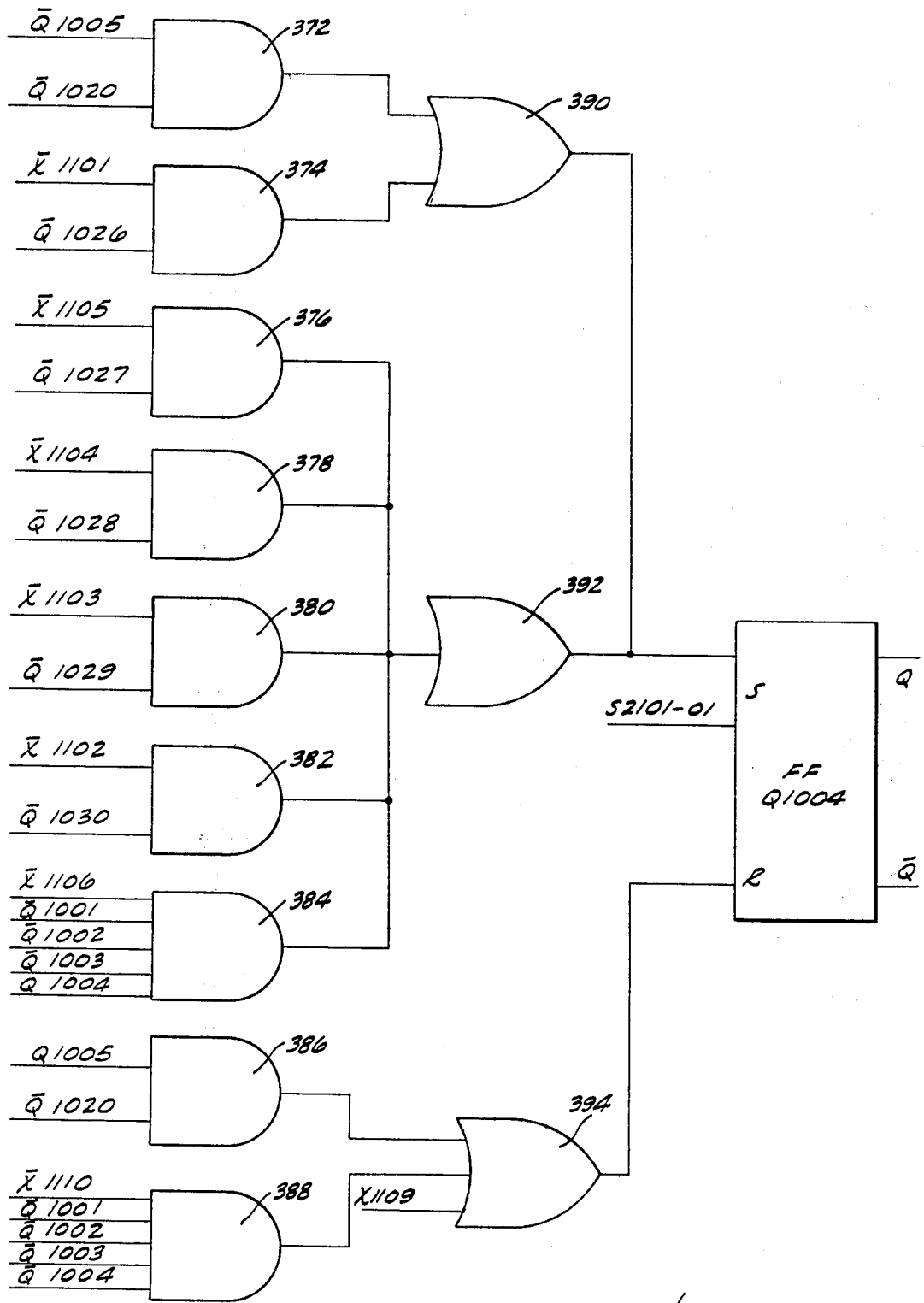
FIG. 14 is a schematic circuit and block diagram of the flip flop Q1004 utilized in the counter of FIG. 4.

The flip flop Q1002 of FIG. 12 is set when S2101-01 is false during serial shifting by a NOR gate 324, during parallel shifting by NOR gates 326, 328, 330, 332 and 334 and during counting by a NOR gate 336, the gates all functioning as "and" gates. The flip flop Q1002 is reset during serial shifting by a NOR gate 338 and during counting by a NOR gate 340, the gates functioning as "and" gates. A NOR gate 342 functioning as an "or" gate responds to gates 324, 326 to apply a set term to the flip flop Q1002 and a NOR gate 344 functioning as an "or" gate responds to gates 328, 330, 332, 334 and 336 to apply a set term to the flip flop. A NOR gate 346 functioning as an "or" gate responds to gates 338 and 340 and to the reset term X1109 to apply a reset term to the flip flop Q1002. The gates 324 and 326 respectively respond to terms $\overline{Q}1003$ and $\overline{Q}1020$ and to terms $\overline{X}1101$ and $\overline{Q}1024$. The gates 328, 330, 332, 334 and 336 respectively respond to terms $\overline{X}1105$ and $\overline{Q}1025$, to terms $\overline{X}1104$ and $\overline{Q}1026$, to terms $\overline{X}1103$ and $\overline{Q}1027$, to terms $\overline{X}1102$ and $\overline{Q}1028$ and to terms $\overline{X}1106$, $\overline{Q}1001$ and Q1002. The gates 338 and 340 respectively respond to terms Q1003 and $\overline{Q}1020$ and to terms $\overline{X}1110$, $\overline{Q}1001$ and $\overline{Q}1002$.

The flip flop Q1003 is set when S2101-01 is false during serial shifting by a NOR gate 348, during parallel shifting by NOR gates 350, 352, 354, 356 and 358 and during counting by a NOR gate 360, all of the gates functioning as "and" gates. The flip flop Q1003 is reset during serial shifting by a NOR gate 362 and during counting by a NOR gate 364, both gates functioning as "and" gates. A NOR gate 366 functioning as an "or" gate responds to gates 348 and 350 to apply a set term to the flip flop Q1003, a NOR gate 368 functioning as an "or" gate responds to gates 352, 354, 356, 358 and 360 to apply a set term to the flip flop and a NOR gate 370 responds to gates 362 and 364 and to a reset term X1109 to apply a reset term to the flip flop. The gates 348 and 350 respectively respond to terms $\overline{Q}1004$ and $\overline{Q}1020$ and to terms $\overline{X}1101$ and $\overline{Q}1025$ and the gates 350, 352, 354, 356, 358 and 360 respectively respond to terms $\overline{X}1105$ and $\overline{X}1026$, to terms $\overline{X}1104$ and $\overline{Q}1027$, to terms $\overline{X}1103$ and $\overline{Q}1028$, to terms $\overline{X}1102$ and $\overline{Q}1029$ and to terms $\overline{X}1106$, $\overline{Q}1001$, $\overline{Q}1002$ and Q1003. The gates 362 and 364 respectively respond to terms Q1004 and $\overline{Q}1020$ and to terms $\overline{X}1110$, $\overline{Q}1001$, $\overline{Q}1002$ and $\overline{Q}1003$.

The flip flop Q1004 is set when S2101-01 is false during serial shifting in response to a NOR gate 372, during parallel shifting in response to NOR gates 374, 376, 378, 380, and 382 and during counting in response to a NOR gate 384, all gates functioning as "and" gates. The flip flop is reset during serial shifting in response to a NOR gate 386 and during counting in response to a NOR gate 388, both gates functioning as "and" gates. A NOR gate 390 functioning as an "or" gate responds to gates 372 and 374 to apply a set term to the flip flop Q1004, a NOR gate 392 functioning as an "or" gate responds to gates 376, 378, 380, 382 and 384 to apply a set term to the flip flop and a NOR gate 394 functioning as an "or" gate responds to gates 386 and 388 and to the reset term X1109 to apply a reset term to the flip flop. The gates 372, 374, 376, 378, 380, 382 and 384 respectively respond to terms Q1005 and $\overline{Q}1020$, to terms $\overline{X}1101$ and $\overline{Q}1026$, to terms $\overline{X}1105$ and $\overline{Q}1027$, to terms $\overline{X}1104$ and $\overline{Q}1028$, to terms $\overline{X}1103$ and $\overline{Q}1029$, to terms $\overline{X}1102$ and $\overline{Q}1030$ and to terms $\overline{X}1106$, $\overline{Q}1001$, $\overline{Q}1002$, $\overline{Q}1003$ and Q1004. The gates 386 and 388 respectively respond to terms Q1005 and $\overline{Q}1020$ and to terms $\overline{X}1110$, $\overline{Q}1001$, $\overline{Q}1002$, $\overline{Q}1003$ and $\overline{Q}1004$.

Figure 15:
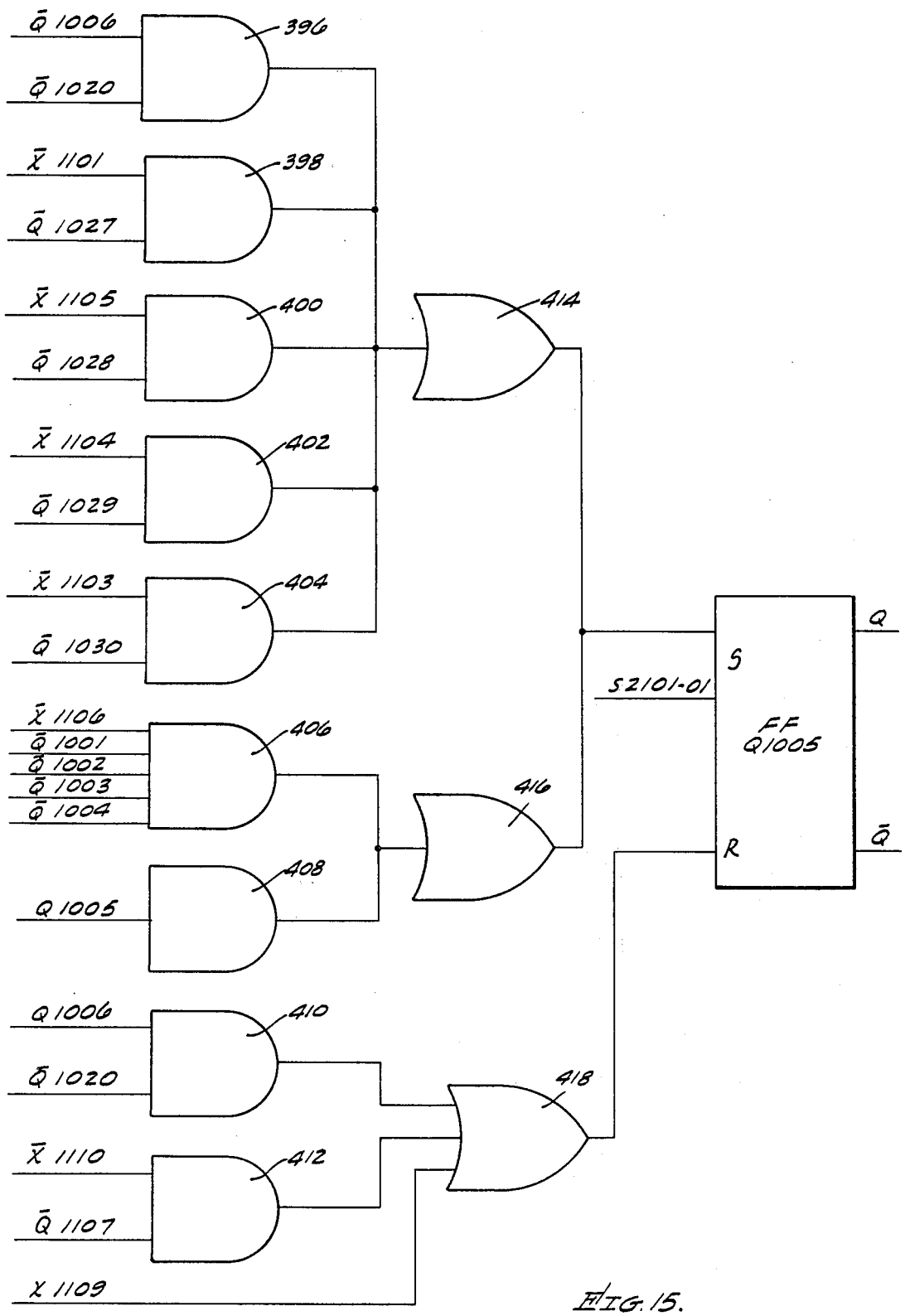
FIG. 15 is a schematic circuit and block diagram of the flip flop Q1005 utilized in the counter of FIG. 4.

The flip flop Q1005 of FIG. 15 is set when Q2101-01 is false during serial shifting by a NOR gate 396 functioning as an "and" gate, during parallel shifting by NOR gates 398, 400, 402 and 404 functioning as "and" gates and during counting to NOR gates 406 and 408 which together function as an "and" gate. The flip flop Q1005 is reset during serial shifting by a NOR gate 410 and during counting by a NOR gate 412, both gates functioning as "and" gates. A NOR gate 414 functioning as an "or" gate responds to gates 396, 398, 400, 402 and 404 to apply a set term to the flip flop Q1005, a NOR gate 416 functioning as an "or" gate responds to gates 406 and 408 to apply a set term to the flip flop and a NOR gate 418 functioning as an "or" gate responds to gates 410 and 412 and to the reset signal X1109 to apply a reset term to the flip flop. The gates 396, 398, 400, 402, 404, 406 and 408 respectively respond to terms $\overline{Q}1006$ and $\overline{Q}1020$, to terms $\overline{X}1101$ and $\overline{Q}1027$, to terms $\overline{X}1105$ and $\overline{Q}1028$, to terms $\overline{X}1104$ and $\overline{Q}1029$, to terms $\overline{X}1103$ and $\overline{Q}1030$, to terms $\overline{X}1106$, $\overline{Q}1001$ $\overline{Q}1002$, $\overline{Q}1003$ and $\overline{Q}1004$ and to the term Q1005. The gates 410 and 412 respectively respond to terms Q1006 and $\overline{Q}1020$ and to terms $\overline{X}1110$ and $\overline{Q}1107$.

Figure 16:
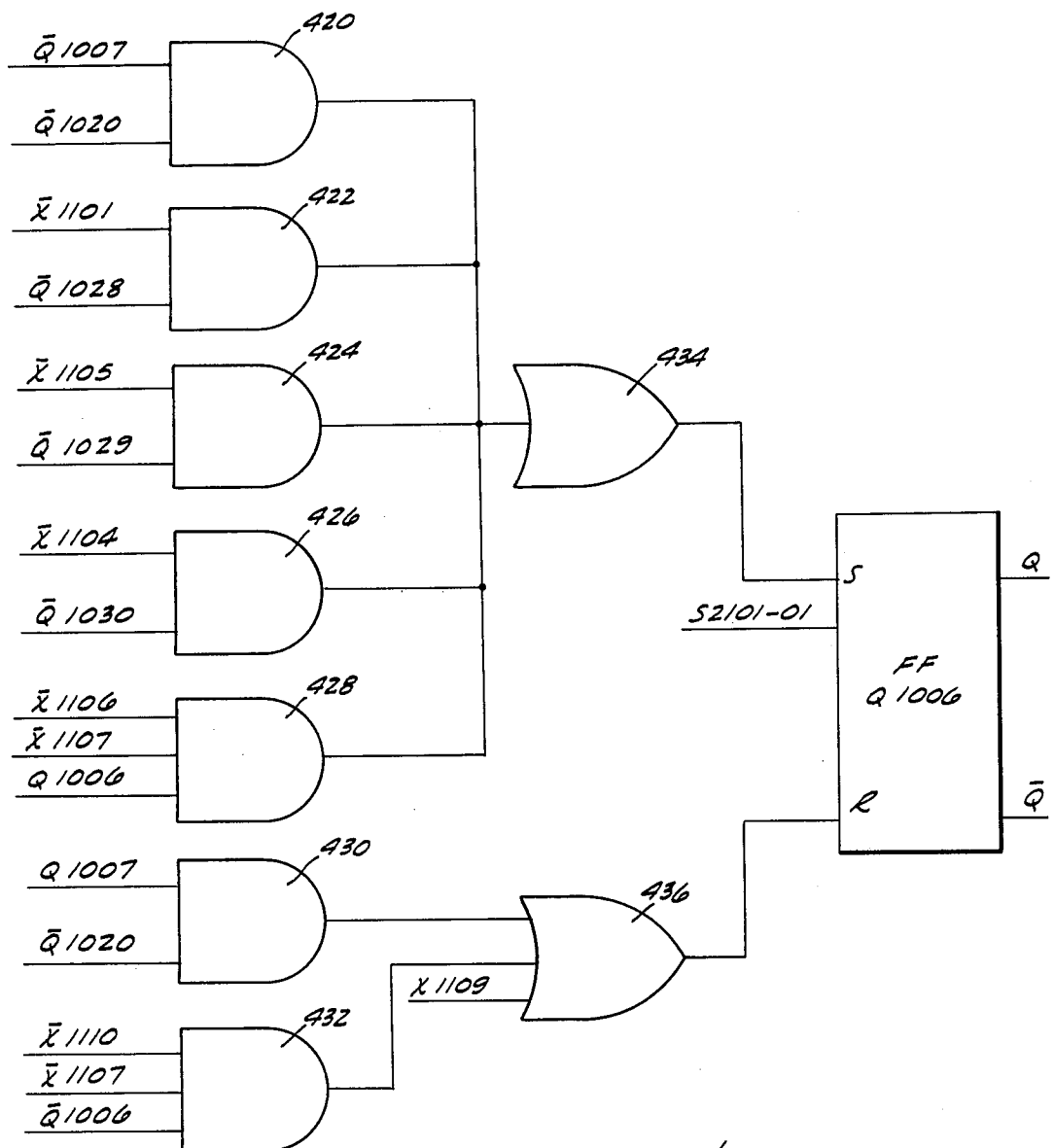
FIG. 16 is a schematic circuit and block diagram of the flip flop Q1006 utilized in the counter of FIG. 4.

The flip flop Q1006 of FIG. 16 is set when Q2101-01 is false during serial shifting by a NOR gate 420, during parallel shifting by NOR gates 422, 424 and 426 and during counting by a NOR gate 428, all gates functioning as "and" gates. The flip flop Q1006 is reset during serial shifting in response to a gate 430 and during counting in response to a gate 432, both gates functioning as "and" gates. A NOR gate 434 functioning as an "or" gate responds to gates 420, 422, 424, 426 and 428 to apply set terms to the flip flop Q1006 and a NOR gate 436 functioning as an "or" gate responds to gates 430 and 432 and to a reset signal X1109 to apply reset terms to the flip flop. The gates 420, 422, 424, 426 and 428 respectively respond to terms $\overline{Q}1007$ and $\overline{Q}1020$, to terms $\overline{X}1101$ and $\overline{Q}1028$, to terms $\overline{X}1105$ and $\overline{Q}1029$, to terms $\overline{X}1104$ and $\overline{Q}1030$ and to terms $\overline{X}1106$, $\overline{X}1107$ and Q1006. The gates 430 and 432 are respectively responsive to terms Q1007 and $\overline{Q}1020$ and to terms $\overline{X}1110$, $\overline{X}1107$ and $\overline{Q}1006$.

Figure 17:
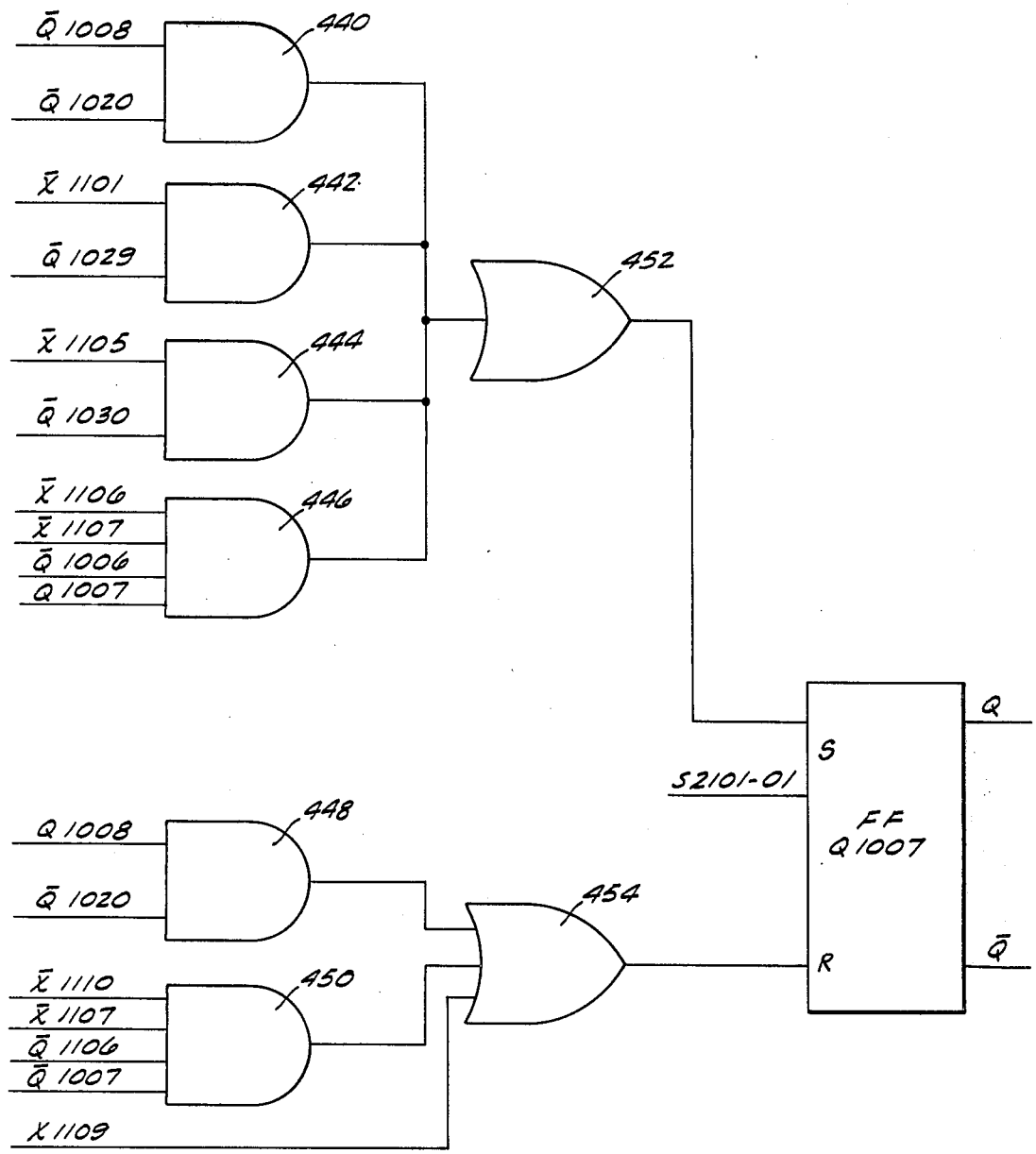
FIG. 17 is a schematic circuit and block diagram of the flip flop Q1007 utilized in the counter of FIG. 4.

The flip flop Q1007 of FIG. 17 is set when S2101-01 is false during serial shifting in response to a NOR gate 440, during parallel shifting in response to NOR gates 442 and 444 and during counting in response to a NOR gate 446, all of the gates functioning as "and" gates. The flip flop Q1007 is reset during serial shifting in response to a NOR gate 448 and during counting in response to a NOR gate 450, both gates functioning as "and" gates. A NOR gate 452 responds to gates 440, 442, 444 and 446 to apply a set term to the flip flop Q1007 and a NOR gate 454 responds to gates 448 and 450 and to a reset signal X1109 to apply a reset term to the flip flop. The gates 440, 442, 444 and 446 are respectively responsive to terms $\overline{Q}1008$ and $\overline{Q}1020$, to terms $\overline{X}1101$ and $\overline{Q}1029$, to terms $\overline{X}1105$ and $\overline{Q}1030$ and to terms $\overline{X}1106$, $\overline{X}1107$, $\overline{Q}1006$ and Q1007. The gates 448 and 450 respectively respond to terms Q1008 and $\overline{Q}1020$ and to terms $\overline{X}1110$, $\overline{X}1107$, $\overline{Q}1106$ and $\overline{Q}1007$.

Figure 18:
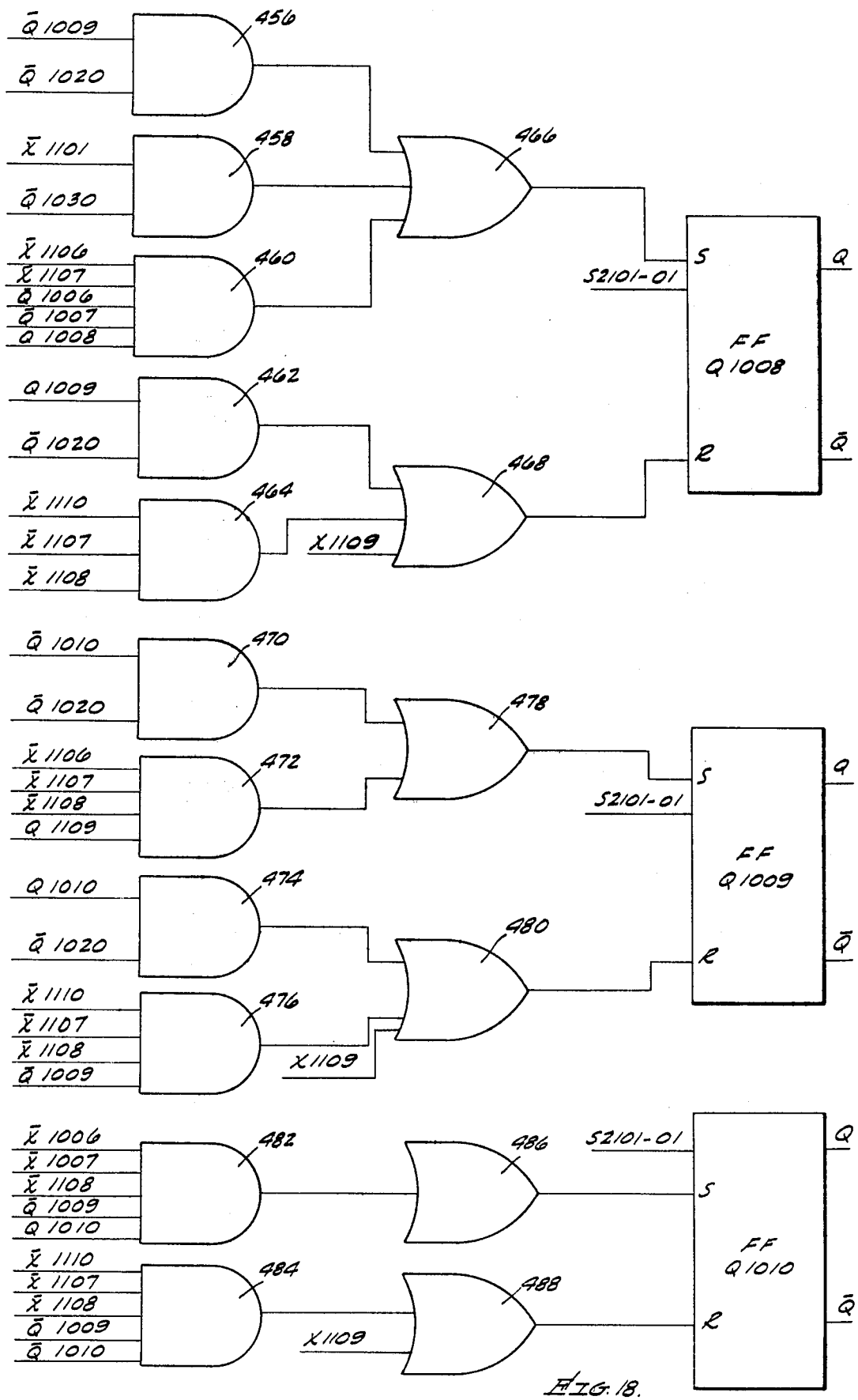
FIG. 18 is a schematic circuit and block diagram of the flip flops Q1008, Q1009 and Q1010 utilized in the counter of FIG. 4 with the flip flop Q1010 representing the most significant bit position.

The flip flop Q1008 of FIG. 18 is set when the term S2101-01 is false during serial shifting is response to a NOR gate 456, during parallel shifting in response to a NOR gate 458 and during counting in response to a NOR gate 460, the gates functioning as "and" gates. The flip flop Q1008 is reset during serial shifting in response to a NOR gate 462 and during counting, in response to a NOR gate 464, both gates functioning as "and" gates. A NOR gate 466 functioning as an "or" gate is responsive to gates 456, 458 and 460 to apply a set term to the flip flop Q1008 and a NOR gate 468 is responsive to gates 462 and 464 and to a reset signal X1109 to apply a reset term to the flip flop. The gates 456, 458, 460, 462 and 464 respectively respond to terms $\overline{Q}1009$ and $\overline{Q}1020$, to terms $\overline{X}1101$ and $\overline{Q}1030$, to terms $\overline{X}1106$, $\overline{X}1107$, $\overline{Q}1006$, $\overline{Q}1007$ and Q1008, to terms Q1009 and $\overline{Q}1020$ and to terms $\overline{X}1110$, $\overline{X}1107$ and $\overline{X}1108$.

The flip flop Q1009 of FIG. 18 is set when Q2101-01 is false during serial shifting in response to a NOR gate 470 and during counting in response to a NOR gate 472, both gates functioning as "and" gates. The flip flop Q1009 is reset in response to a NOR gate 474 during serial shifting and in response to a NOR gate 476 during counting, both gates performing an "and" function. A NOR gate 478 functioning as an "or" gate is responsive to the gates 470 and 472 to apply a set term to the flip flop Q1009 and a NOR gate 480 functioning as an "or" gate is responsive to the gates 474 and 476 and to the term X1109 to apply a reset term to the flip flop. The gates 470, 472, 474 and 476 respectively respond to terms $\overline{Q}1010$ and $\overline{Q}1020$, to terms $\overline{X}1106$, $\overline{X}1107$, $\overline{X}1108$ and Q1009, to terms Q1010 and $\overline{Q}1020$ and to terms $\overline{X}1110$, $\overline{X}1107$, $\overline{X}1108$ and $\overline{Q}1009$.

The flip flop Q1010 of FIG. 18 is set in response to a NOR gate 482 when Q2101-01 is false and is reset in response to a NOR gate 484, both gates functioning as "and" gates. An inverting gate 486 is coupled between the gate 482 and a set input terminal of the flip flop Q1010 and a NOR gate 488 functioning as an "or" gate is coupled to the gate 484 and a reset signal X1109 to apply a reset term to the flip flop. The gates 482 and 484 respectively respond to terms $\overline{X}1006$, $\overline{X}1007$, $\overline{X}1108$, $\overline{Q}1009$ and Q1010 and to terms $\overline{X}1110$, $\overline{X}1107$, $\overline{X}1108$, $\overline{Q}1009$ and $\overline{Q}1010$.

Referring now to FIG. 19 the gates for forming the counter shifting control terms X1101 to X1105, for forming the term X1106 during the 80 to 160 mile nautical range, for forming the terms X1107 and X1108 for controlling normal counting and the counter reset term X1109 will be explained in further detail. A NOR gate 492 functioning as an "and" gate responds to the terms $\overline{Q}1015$, $\overline{Q}1016$ and $\overline{Q}1019$ to develop the signal X1101 and a NOR gate 494 functioning as an "and" gate responds to terms $\overline{Q}1014$ and $\overline{Q}1019$ to develop the signal X1102. A NOR gate 496 functioning as an "and" gate responds to the terms $\overline{Q}1013$ and $\overline{Q}1019$ to develop the signal X1103, a NOR gate 498 functioning as an "and" gate responds to the terms $\overline{Q}1012$ and $\overline{Q}1019$ to develop the signal X1104 and a NOR gate 1450 functioning as an "and" gate responds to the terms $\overline{Q1011}$ and $\overline{Q1019}$ to develop the signal X1105. The 80 to 160 mile term X1106 is developed by a NOR gate 1452 functioning as an "and" gate in response to Q1017, $\overline{Q1032}$ and $\overline{Q2309}$. The counter implementation terms X1107 and X1108 are developed by NOR gates 1454 and 1456 respectively responsive to terms $\overline{Q1001}$, $\overline{Q1002}$, $\overline{Q1003}$, $\overline{Q1004}$ and $\overline{Q1005}$ and to terms $\overline{Q1006}$, $\overline{Q1007}$ and $\overline{Q1008}$. The counter reset term $\overline{X1109}$ is developed by a NOR gate 1458 functioning as an "or" gate in response to Q1018 which goes true to clear the counter in preparation for the correction cycle, in response to $\overline{X1120}$ which is true at the end of a comparison sweep and to the master clear signal S2101-01.

The constant selector flip flops Q1011 to Q1016 of the circuit 60 (FIG. 4) effectively examine various stages of the count accumulating in the Mod 1024 counter 58 and are gated so that the correct flip flop is set upon the occurrence of a correction cycle. The following table indicates at which count each flip flop is set and the corresponding constant that is selected.

| Count Interval | Flip Flop | State of Q1016 | Constant Selected |
|---|---|---|---|
| 0–64 | Q1011 | 0 | ⅛ |
| 65–160 | Q1012 | 0 | 1/16 |
| 161–216 | Q1013 | 0 | 1/32 |
| 217–240 | Q1014 | 0 | 1/64 |
| 241–304 | Q1015 | 0 | 0 (no change) |
| 305–320 | Q1014 | 1 | 1/64 |
| 321–384 | Q1013 | 1 | 1/32 |
| 385–512 | Q1012 | 1 | 1/16 |
| 513–768 | Q1011 | 1 | ⅛ |
| 769–1024 | Q1015 | 1 | ⅛ |

The logical equations for the constant selector flip flop are:

S1011 = S2101-02(X1120 + X1130)C.

R1011 = (X1131 + X1132 + S2101-01)C.

S1012 = S2101-02(X1131 + X1133)C.

R1012 = (X1120 + X1130 + X1134 + 5210-01)C.

S1013 = S2101-02(X1134 + X1135)C.

R1013 = (X1120 + X1133 + X1136 + S2101-01)C.

S1014 = S2101-02(X1136 + X1137)C.

R1014 = (X1120 + X1135 + X1138 + S2101-01)C.

S1015 = S2101-02(X1132 + X1138)C.

R1015 = (X1120 + X1137 + S2101-01)C.

S1016 = S2101-02X1137C.

R1016 = (X1120 + S2101-01)C.

Initially all of the constant selector flip flops are preset to the condition with Q1011 in a set state and the others reset by a gate X1120 where:

X1120 = X1161 + X4150

X1161 = $(\overline{S101})(\overline{S102})(\overline{S103})(\overline{S104})(\overline{S105})(\overline{S106})$Q2050

The term X1161 is thus developed by a gate which indicates when the selected comparison sweep has occurred at master trigger time indicated by the signal Q2050. Because the sweep counter 40 changes state in response to the master trigger signal, the signal X1161 goes true at the start of the last sweep such as the eighth sweep. The signal X4150 is developed by a gate in the target detector (not shown) responding to all "ones" in the 10 flip flops at the least significant bit positions of the sweep counter for resetting the skimmer, to assure that a correction cycle only occurs after a selected number of sweep counts. The flip flop Q1016 is the add-subtract controlling flip flop and when in the reset state, a subtraction is performed during the serial shifting operation because the count was equal to or less than the confidence interval. When the flip flop Q1016 is set (the skim level is too low) an addition is performed during the shifting operation. The states of flip flop Q1016 is sensed by gates developing terms X1121 and X1122 during the 80 to 160 mile range interval when the term Q2309 is true.

X1121 = Q1016.Q2309

X1122 = $\overline{Q1016}$.Q2309

Gates are provided to develop terms X1130 to X1138 for setting and resetting the constant selector flip flops as indicated by the following expressions:

X1130 = Q1012.X1121.Q1010

X1131 = Q1011.X1122.Q1017

X1132 = Q1011.X1121.Q1009.Q1010

X1133 = Q1013.X1121.Q1008.Q1009

X1134 = Q1012.X1122.Q1006.Q1008

X1135 = Q1014.X1121.Q1007.Q1009

X1136 = Q1013.X1122.Q1004.Q1005.Q1007

X1137 = Q1015.X1122.Q1005.Q1006.Q1007

X1138 = Q1014.X1122.Q1005.Q1006

Figure 20:
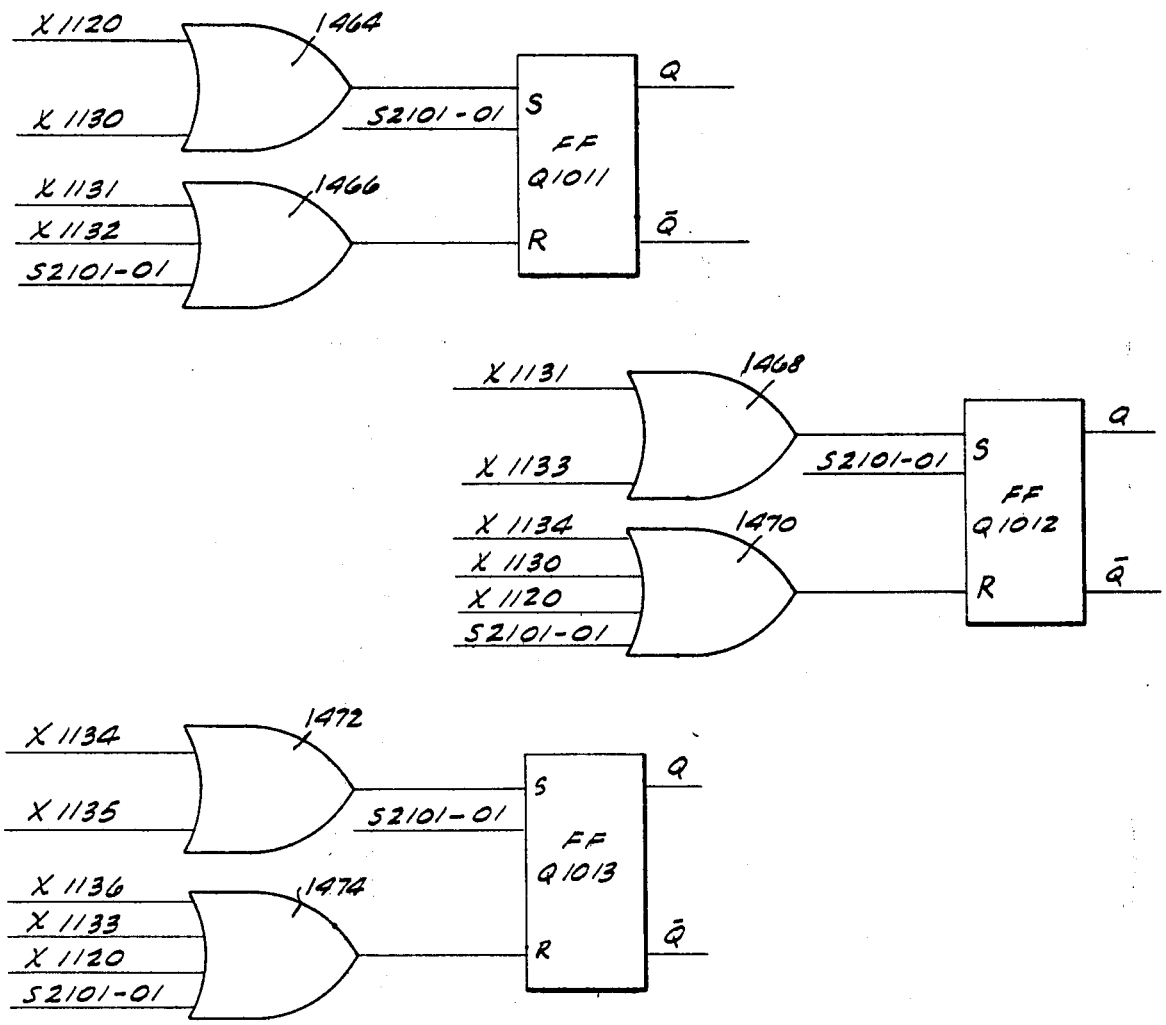
FIG. 20 is a schematic circuit and block diagram of the flip flops Q1011, Q1012 and Q1013 functioning as constant selector flip flops in the system of FIG. 4.

The flip flop Q1011 of FIG. 20 is set at a count of 0, is reset at a count of 63, is set at a count of 512 and is reset at a count of 767. A NOR gate 1464 functioning as an "or" gate responds to terms X1120 and X1130 to set the flip flop Q1101 and a NOR gate 1466 functioning as an "or" gate in response to terms X1131, X1132 and S2101-01 to reset the flip flop. The flip flop Q1012 is set on a count of 64, reset on a count of 159, set on a count of 384 and reset on a count of 511. A NOR gate 1468 functions as an "or" gate in response to terms X1131 and X1133 to set the flip flop Q1012 and a NOR gate 1470 functions as an "or" gate in response to terms X1134, X1130, X1120 and S2101-01 to reset the flip flop. The flip flop Q1013 is set on the count of 160, is reset on the count of 215, set on the count of 336 and reset on the count of 303. A NOR gate 1472 functions as an "or" gate in response to the terms X1134 and X1135 to set the flip flop Q1013 and a NOR gate 1474 functions as an "or" gate in response to the terms X1136, X1133, X1120 and S2101-01 to reset the flip flop. The master clear signal S2101-01 which is normally false, is "anded" with the signal developed by the gate 1472 in the gate of the flip flop.

Figure 21:
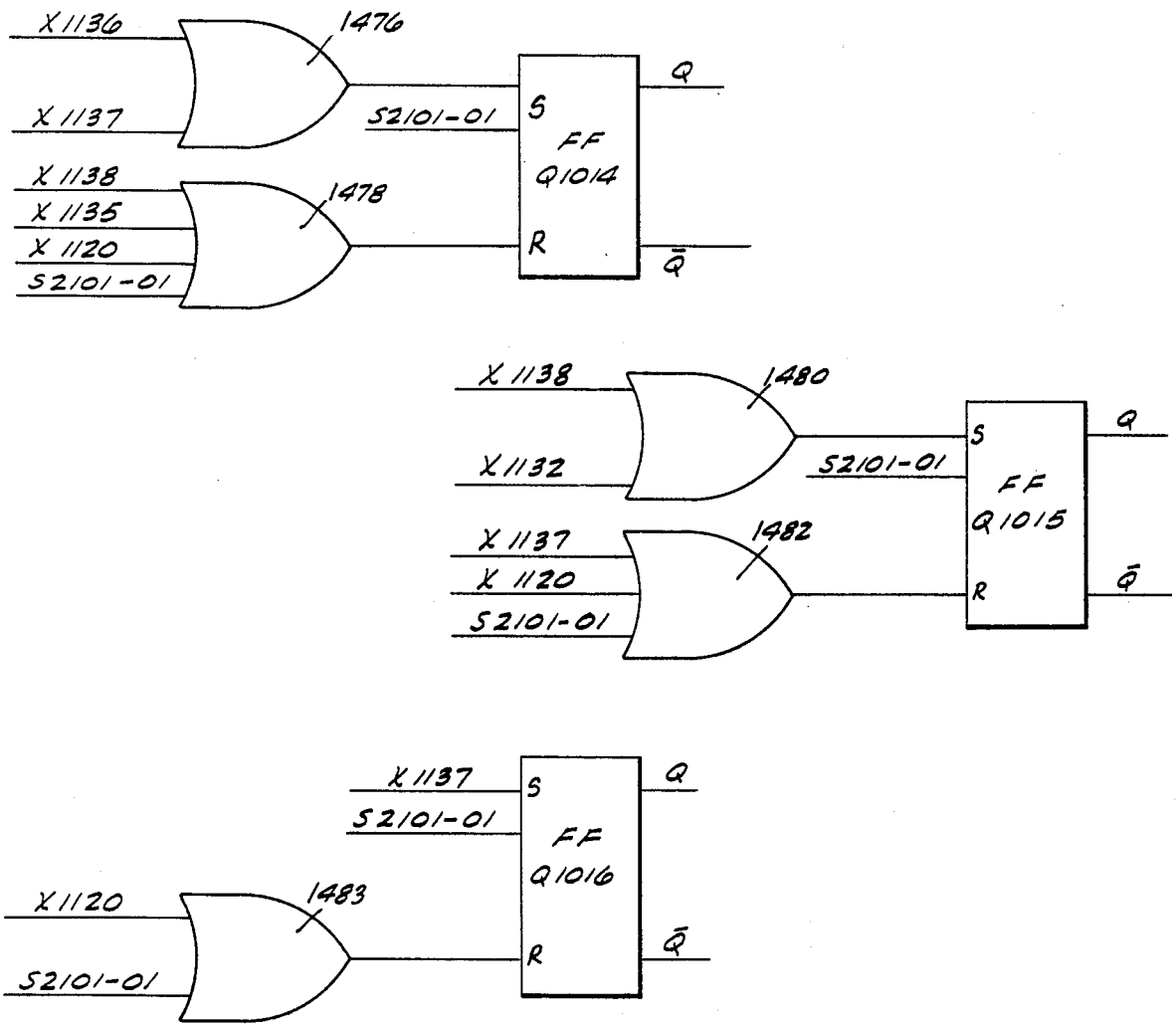
FIG. 21 is a schematic circuit and block diagram of the flip flops Q1014 and Q1015 utilized as constant selector flip flops and of the flip flop Q1016 utilized as an add-subtract control flip flop in the system of FIG. 4.

The flip flop Q1014 of FIG. 21 is set on the count of 216, reset on the count of 263, set on the count of 303 and reset on the count of 335. A NOR gate 1476 functioning as an "or" gate responds to terms X1136 and X1137 to set the flip flop when "anded" with the master clear term S2101-01 which is normally at a false level. The flip flop Q1014 is reset in response to a NOR gate 1478 functioning as an "or" gate in response to terms X1138, X1135, X1120 and S2101-01.

The flip flop Q1015 is set on the count of 264, reset on the count of 303, set on the count of 768 and reset on the count of 1024. A NOR gate 1480 functioning as an "or" gate responds to terms X1138 and X1132 to set the flip flop after being "anded" with S2101-01. The flip flop Q1015 is reset in response to a NOR gate 1482 functioning as an "or" gate and receiving terms X1137, X1120 and S2101-01.

The add-subtract controlling flip flop Q1016 is set at a count of 303 and reset at the master trigger pulse. The flip flop is set in response to the terms X1137 and S2101-01 and is reset in response to the terms X1120 and S2101-01 applied to a NOR gate 1483 functioning as an "or" gate. It is to be noted that the normally false term S2101-01 is applied to the set input terminals of the flip flops Q1014, Q1015 and Q1016 to prevent the flip flops from being set when being reset by the same term applied to the gate at the reset terminal.

Referring now to FIGS. 19 and 22, the gates for forming $\overline{X}1120$, X1121, X1122 and X1130 to X1138 will be explained, these gates controlling the setting and resetting of the constant selector flip flops. A NOR gate 1489 functions as an "or" gate in response to X1161 and X4150 to develop the reset term $\overline{X}1120$. A NOR gate 1491 functions as an "and" gate in response to S101 to S106 and to $\overline{Q}2050$ to develop the term X1161. A NOR gate 1490 functions as an "and" gate in response to the terms $\overline{Q}1016$ and $\overline{Q}2309$ to develop the signal X1121. A NOR gate 1492 functions as an "and" gate in response to terms Q1016 and $\overline{Q}2309$ to develop the signal X1122. The signals X1130 and X1131 are developed by respective NOR gates 1494 and 1496 functioning as "and" gates and respectively responsive to terms $\overline{Q}1121$, $\overline{X}1121$ and $\overline{Q}1010$ and to terms $\overline{Q}1011$, $\overline{X}1122$ and $\overline{Q}1007$. The signals X1132 and X1133 are developed by NOR gates 1498 and 1500 both functioning as "and" gates and respectively responsive to terms $\overline{X}1121$, $\overline{Q}1011$, Q1009 and Q1010 and to terms X1121, Q1013, Q1008 and $\overline{Q}1009$. The signals X1134 and X1135 are developed by NOR gates 502 and 504 both functioning as "and" gates and respectively responsive to terms $\overline{Q}1012$, $\overline{X}1122$, $\overline{Q}1006$ and $\overline{Q}1008$ and to terms $\overline{X}1121$, $\overline{Q}1014$, $\overline{Q}1007$ and $\overline{Q}1009$. The signals X1136 and X1137 are developed by NOR gates 506 and 508 which function as "and" gates in response to respective groups of terms $\overline{X}1122$, $\overline{Q}1013$, $\overline{Q}1004$, $\overline{Q}1005$ and $\overline{Q}1007$ and terms $\overline{X}1122$, $\overline{Q}1015$, $\overline{Q}1005$, $\overline{Q}1006$ and $\overline{Q}1007$. A NOR gate 510 functions as an "and" gate in response to $\overline{X}1122$, $\overline{Q}1014$, $\overline{Q}1005$ and $\overline{Q}1006$ to develop the signal X1138.

The digilog register 62 including flip flops Q1021 to Q1030 functions during the 80 to 160 mile range intervals to maintain the stored digital value of each skim level for being continuously applied to the integrator and detector 44 as an analog voltage and functions during a correction cycle to parallel transfer the digital skim level data to the counter 58 shifted to a weighted position as determined by the states of the constant selector flip flops. During the ten serial shifting periods of the correction cycle, the digital value in the counter is shifted from the least significant digit position of Q1001 to the most significant position of the digilog register into serial adder flip flop Q1030 in conjunction with the shifted contents of the digilog register received from the least significant flip flop Q1021. Also the contents of the carry-borrow flip flop Q1031 are applied to the adder flip flop Q1030 to perform either addition or subtraction. The shifting in the digilog register is controlled by the gate X1140 which is a function of either the Q1020 timing flip flop that is set for 10 bit times to enable serial shifting or a function of the master clear signal.

$$X1140 = Q1020 + S2101\text{-}01.$$

When the register 62 is cleared by the master clear term S2101-01 going to a true level for 10 clock periods, a threshold reset is provided by Q1034 at some later time as $S1029 = (X1160 + \ldots)C$ and X1160 is developed in response to the flip flop Q1034 being set and a proper quadrant interval signal being developed. The logical terms for shifting of the flip flops Q1021 to Q1029 are:

$$S1021 = Q1022 X1140 C$$

$$R1021 = \overline{Q}1022 X1140 C$$

$$S1022 = Q1023 X1140 C$$
$$R1022 = \overline{Q}1023 X1140 C$$

$$S1023 = Q1024 X1140 C$$

$$R1023 = \overline{Q}1024 X1140 C$$

$$S1024 = Q1025 X1140 C$$

$$R1024 = \overline{Q}1025 X1140 C$$

$$S1025 = Q1026 X1140 C$$

$$R1025 = \overline{Q}1026 X1140 C$$

$$S1026 = Q1027 X1140 C$$

$$R1026 = \overline{Q}1027 X1140 C$$

$$S1027 = Q1028 X1140 C$$

$$R1027 = \overline{Q}1028 X1140 C$$

$$S1028 = Q1029 X1140 C$$

$$R1028 = \overline{Q}1029 X1140 C$$

$$S1029 = (Q1030 X1140 + \ldots )C$$

$$R1029 = \overline{Q}1030 X1140 C$$

Referring now to FIG. 23, the flip flop Q1021 is set in response to terms $\overline{Q}1022$ and X1140 applied to the "and" gate thereof and is reset in response to terms Q1022 and X1140. The flip flop Q1022 is set in response to terms $\overline{Q}1023$ and X1140 and reset in response to terms Q1023 and X1140. The flip flops Q1023 to Q1028 are arranged according to the above expressions to perform serial shifting and will not be explained in further detail. The flip flop Q1029 responds to a NOR gate 514 functioning as an "and" gate in response to terms $\overline{Q1030}$ and X1140 and a NOR gate 516 functioning as an "or" gate in response to the signal developed by the gate 514 and the term X1160 to set the flip flop. The flip flop Q1029 is reset in response to the terms X1030 and X1140. A NOR gate 518 of FIG. 22 functions as an "or" gate in response to Q1020 and S2101-01 to develop the term X1140 which is normally at a true level.

The add-subtract flip flop Q1030 and the carry-borrow flip flop Q1031 serially combine the states of flip flops Q1001 and Q1021 during the Q1020 times. The add-subtract operation is controlled by a gate X1141.

$$X1141 = Q1020 \cdot S2101\text{-}02$$

The following expressions define the input logic of the add-subtract and the carry-borrow flip flops:

$$S1031 = Q1020(Q1001 \cdot Q1021 \cdot Q1016 + Q1001 \cdot \overline{Q}1021 \cdot \overline{Q}1016) + S1900\text{-}01C.$$

$$R1031 = Q1020(\overline{Q}1001 \cdot \overline{Q}1021 \cdot Q1016 + \overline{Q}1001 \cdot Q1021 \cdot \overline{Q}1016)C.$$

$$S1030 = X1141(Q1001 \cdot Q1021 \cdot Q1031 + Q1001 \cdot \overline{Q}1021 \cdot \overline{Q}1031 + \overline{Q}1001 \cdot Q1021 \cdot \overline{Q}1031 + \overline{Q}1001 \cdot \overline{Q}1021 \cdot Q1031)C.$$

$$R1030 = (Q1020 + S2101\text{-}01)(\overline{Q}1001 \cdot \overline{Q}1021 \cdot \overline{Q}1031 + \overline{Q}1001 \cdot Q1021 \cdot Q1031 + Q1001 \cdot \overline{Q}1021 \cdot Q1031 + Q1001 \cdot Q1021 \cdot \overline{Q}1031 + S2101\text{-}01)C.$$

A "one" is forced into the carry-borrow flip flop Q1031 at all times except when in the confidence interval and when a switch S1900-01 is in the "on" position.

$$S1900\text{-}01 = 0V. \text{ in "off" position}$$

$$S1900\text{-}01 = Q1019(\overline{Q}1015 + Q1016) \text{ in "on" position.}$$

To further explain the addition and subtraction operation as controlled by the flip flop Q1016, the following table shows the serial adding of the states of Q1021 and Q1001 and the subtracting of the states of Q1001 from Q1021 assuming Q1021 is 1100 and Q1001 is 1010, for example, during four clock periods of Q1020 time.

| Q1021 | Q1001 | CARRY | BORROW | SUM Q1021 + Q1001 | DIFFERENCE Q1021 − Q1001 |
|---|---|---|---|---|---|
| 0 | 0 | 0 | 0 | 0 | 0 |
| 0 | 1 | 0 | 1 | 1 | 1 |
| 1 | 0 | 0 | 0 | 1 | 1 |
| 1 | 1 | 1 | 0 | 0 | 0 |

As the sum and the difference of Q1021 and Q1001 are the same for addition or subtraction of any two values and the carry and the borrow values vary, only the carry-borrow flip flop is controlled by the flip flop Q1016. The terms for setting and resetting Q1030 and Q1031 are derived from a truth table as is well known in the art.

Figure 24:
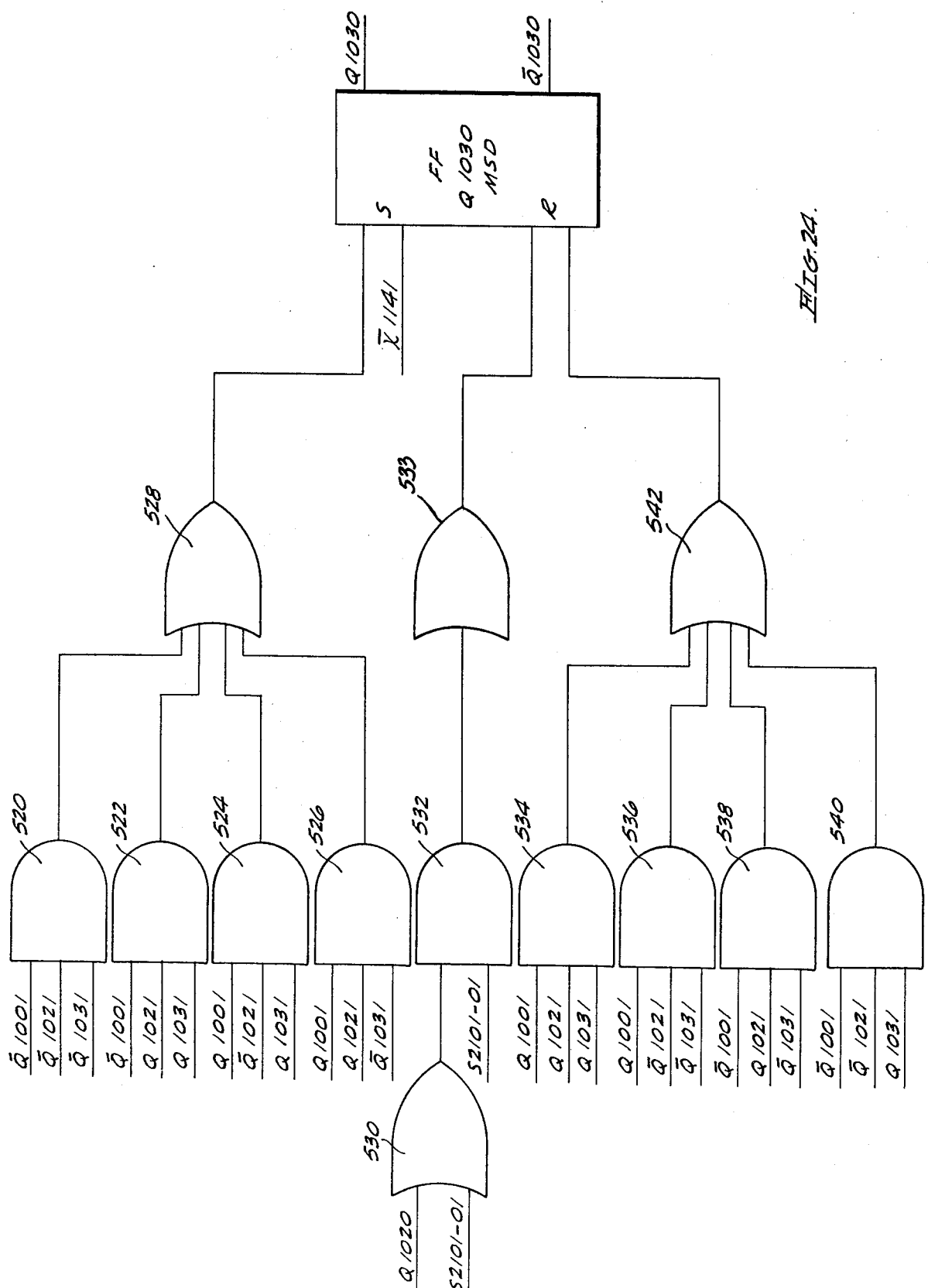
FIG. 24 is a schematic circuit and block diagram of the flip flop Q1030 utilized as the serial adder flip flop at the most significant bit position of the digilog register of FIG. 4.

Referring now to FIG. 24, the flip flop Q1030 is set in response to NOR gates 520, 522, 524 and 526 all functioning as "and" gates and respectively responsive to terms $\overline{Q}1001$, $\overline{Q}1021$ and $\overline{Q}1031$, to terms $\overline{Q}1001$, Q1021 and Q1031, to terms Q1001, $\overline{Q}1021$ and Q1031 and to terms Q1001, Q1021 and $\overline{Q}1031$. A NOR gate 528 functions as an "or" gate in response to signals developed by the gates 520, 522, 524 and 526 to apply a set signal to the flip flop Q1030 in combination with the normally true term $\overline{X}1141$. Resetting of the flip flop Q1030 is controlled by a NOR gate 530 functioning as an "or" gate in response to the terms Q1020 and S2101-01. A NOR gate 532 functions as an "and" gate in response to the signal developed by the gate 530 and the term S2101-01 to apply a reset term through the 'OR' gate inventor 533 to the flip flop Q1030. The flip flop is also reset in response to NOR gates 534, 536, 538 and 540 functioning as "and" gates and respectively responsive to terms Q1001, Q1021 and Q1031, to terms Q1001, $\overline{Q}1021$ and $\overline{Q}1031$, to terms $\overline{Q}1001$, Q1021 and $\overline{Q}1031$ and to terms $\overline{Q}1001$, $\overline{Q}1021$ and Q1031. A NOR gate 542 functions as an "or" gate in response to signals developed by the gates 534, 536, 538 and 540 to apply a reset term to NOR gate functioning as an "and" gate in the flip flop Q1030.

Figure 25:
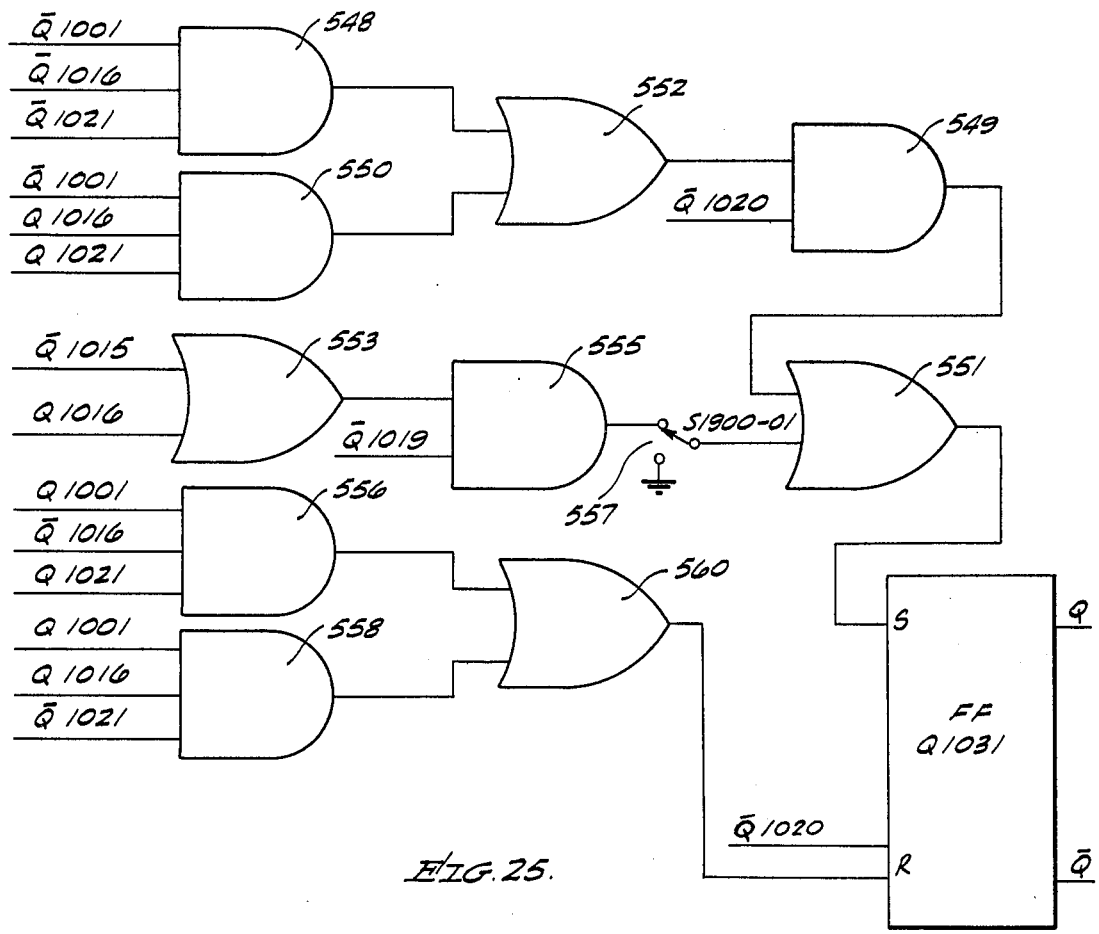
FIG. 25 is a schematic circuit and block diagram of the carry-borrow flip flop Q1031 utilized in the system of FIG. 4.

The carry-borrow flip flop Q1031 of FIG. 25 is set in response to NOR gates 548 and 550 functioning as "and" gates and respectively responsive to terms $\overline{Q}1001$, $\overline{Q}1016$ and $\overline{Q}1021$ and to terms $\overline{Q}1001$, Q1016 and Q1021. A NOR gate 552 functioning as an "or" gate is coupled to the gates 548 and 550 to apply a signal to a NOR gate 549 functioning as an "and" gate which also receives the term $\overline{Q}1020$. A NOR gate 551 functions as an "or" gate in response to the signal developed by the gate 549 and the switch term S1900-01. For forcing a "one" into the flip flop, a NOR gate 553 functions as an "or" gate in response to the terms $\overline{Q}1015$ and Q1016 to apply a signal to a NOR gate 555 functioning as an "and" gate and also receiving the term $\overline{Q}1019$. A switch 557 is selectably connectable from the gate 555 or ground to the gate 551 to allow operation without forcing a "one" into the carry-borrow flip flop. The flip flop is reset in response to NOR gates 556 and 558 functioning as "and" gates and resectively responsive to terms Q1001, $\overline{Q}1016$ and Q1021 and to terms Q1001, Q1016 and $\overline{Q}1021$. A NOR gate 560 functioning as an "or" gate is coupled to the gates 556 and 558 to apply a reset signal to the flip flop in coincidence with the term $\overline{Q}1020$. A NOR gate 518 of FIG. 22 functions as an "or" gate in response to terms Q1020 and S2101-01 to develop the term X1140. A NOR gate 561 of FIG. 22 functions as an "and" gate in response to terms $\overline{Q}1020$ and S2101-02 to develop the term X1141.

Figure 26:
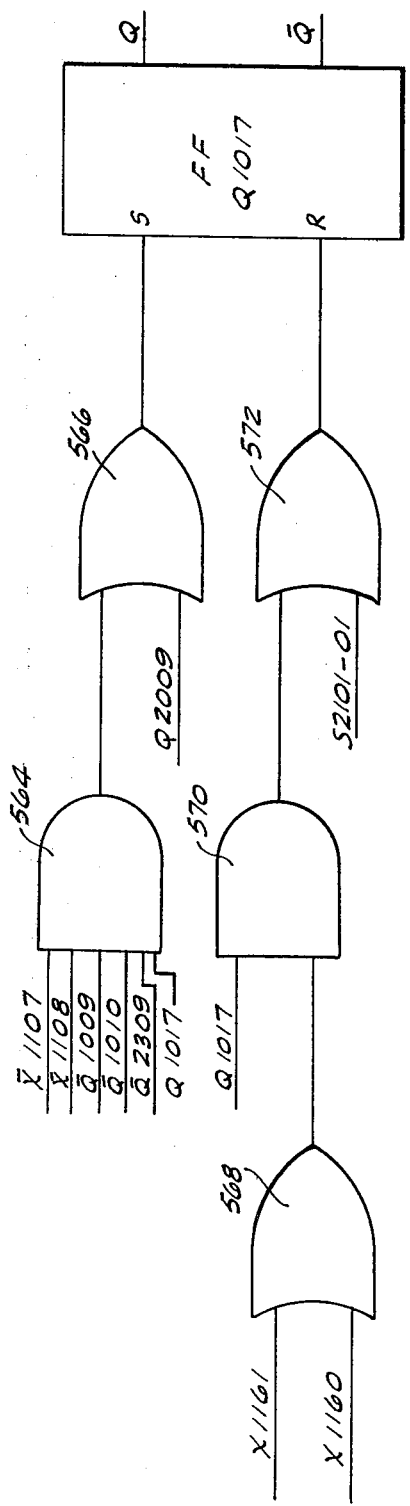
FIG. 26 is a schematic circuit and block diagram of the flip flop Q1017 utilized as the jam-indicator flip flop in the system of FIG. 4.

To further explain the control flip flops, the jam indicator flip flop Q1017 as illustrated in FIGS. 4 and 26 controls the flip flop Q1018 to prevent a correction cycle from being performed when the counter has overflowed or the system is jammed as determined by the flip flop signal Q2009 which is the target detector jamming indicator signal. When the flip flop Q1017 is set the succeeding correction after the selected number of sweeps such as 8 is inhibited from occurring. The flip flop Q1017 is reset at master trigger time of the next comparison sweep (X1161) or at the next quadrant boundary if Q1034 is set and X1160 is true or the master clear signal is true. If the flip flop Q1017 is reset and the signal Q2009 is still true from an interference or jamming condition, the flip flop Q1017 is again set. Thus, the flip flop Q1017 controls system jamming such as from a jamming source, false jam indications when the skim level is too low to correct itself such as during start up, and overflow of the Mod 1024 counter, also indicating a jamming or interference condition. During legitimate system jamming or interference a criteria is assumed of at least 50 percent noise returns over the full jamming intervals such as during the selected 8 sweeps.

For the selected range bin interval, a possibility of 2048 noise (and target) returns may be sensed. If a count of 1024 or 50 percent of 2048 is reached, then flip flop Q1017 is set to inhibit Q1018 to prevent a correction cycle and maintain the skim level at its preceding value. The gate term X1160 may be expressed as follows:

$$X1160 = Q1034 \cdot X4250$$

where X4250 is the quadrant boundary indicator signal developed by the signal forming mechanism 43 of FIG. 4. It is to be noted at this time that because the flip flop Q1034 is not set until the signal X4250 is true, the flip flop Q1017 is only set at the following quadrant signal X4250. The logic for the flip flop Q1017 is as follows:

$$S1017 = (\overline{Q1017} \cdot Q2309 \cdot Q1009 \cdot Q1010 \cdot X1107 \cdot X1108 + Q2009)C.$$

$$R1017 = Q1017(X1160 + X1161) + S2101\text{-}01\ C.$$

For the setting operation the terms Q1009 and Q1010 represent the most significant digits of the counter to indicate an overflow, $\overline{Q1017}$ indicates that the flip flop is in a reset state, X1107 and X1108 indicate that the eight least significant bits in the counter are "ones" and Q2009 indicates jamming from an outside source.

Referring now to FIG. 26, a NOR gate 564 functions as an "and" gate in response to terms $\overline{X1107}$, $\overline{X1108}$, $\overline{Q1009}$, $\overline{Q1010}$, $\overline{Q2309}$ and Q1017. A NOR gate 566 functions as an "or" gate and responds to the signal developed by the gate 564 and to the term Q2009 to set the flip flop. A NOR gate 568 functions as an "or" gate in response to terms X1160 and X1161 to apply a signal in conjunction with a term Q1017 to a NOR gate 570 functioning as an "and" gate. A NOR gate 572 functions as an "or" gate in response to the signal developed by the gate 570 and a master clear term S2101-01 to reset the flip flop Q1017. As shown in FIG. 22 the term X1160 is developed by a NOR gate 571 functioning as an "and" gate in response to the terms $\overline{Q1034}$ and $\overline{X4250}$ to develop the term X1160.

Figure 27:
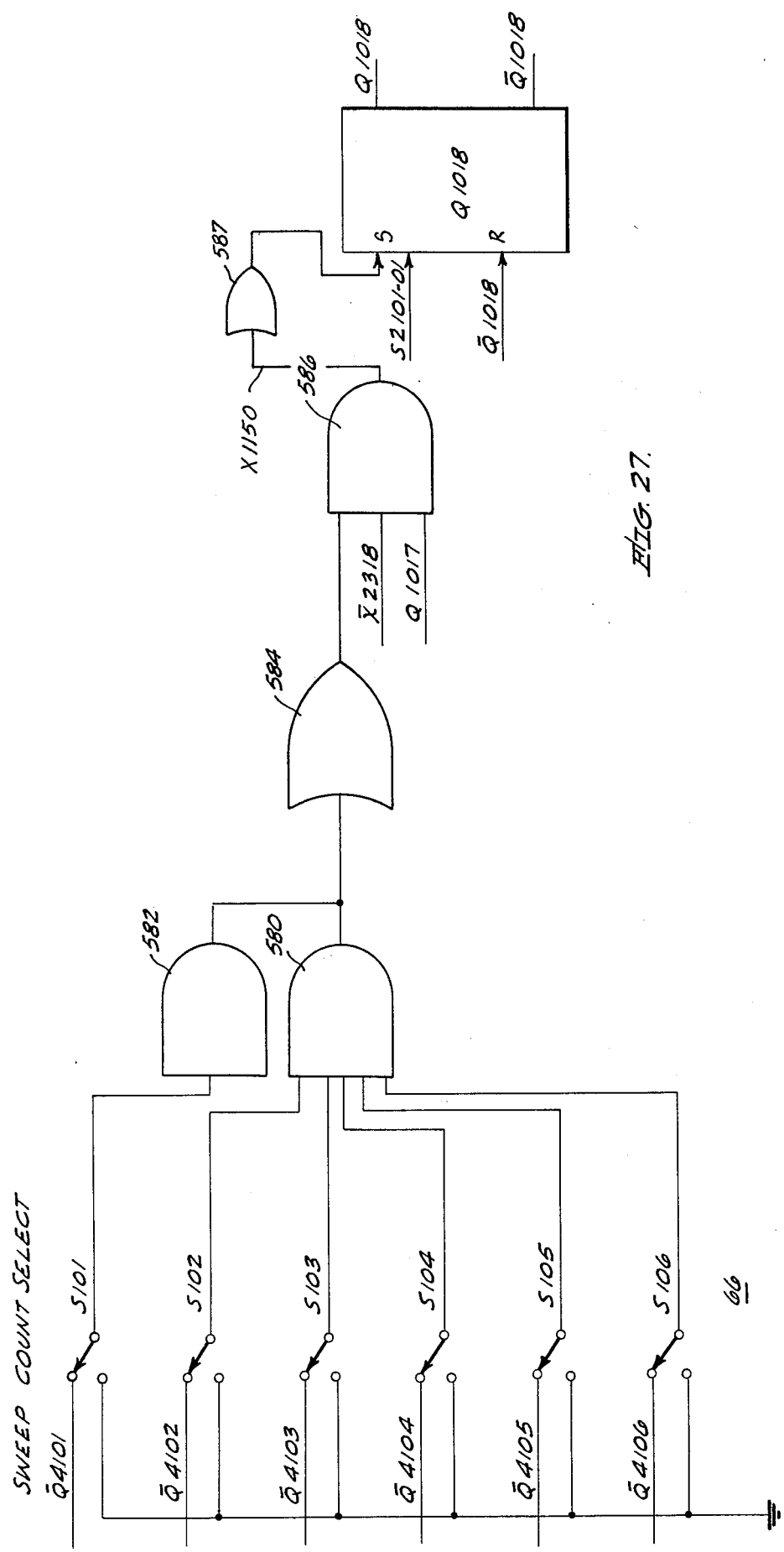
FIG. 27 is a schematic circuit and block diagram of the timing flip flop Q1018 utilized for counter reset control operation in the system of FIG. 4.

The arithmetic operations of clear, parallel and serial shift, add and subtract are controlled by flip flops Q1018, Q1019 and Q1020 as illustrated in FIGS. 4, 27 and 28. The number of sweeps for which the comparison is made is controlled by the setting of switches S101 to S106 in response to the state of the false output terminals of the flip flops Q4101 to Q4106 of the sweep counter 40 of FIG. 4, $\overline{Q4101}$ being the least significant bit position. The following table shows the arrangement of the switches S101 to S106.

| Switch | "ON" Position | "OFF" Position |
|---|---|---|
| S101-01 | $\overline{Q4101}$ | 0V. |
| S102-01 | $\overline{Q4102}$ | 0V. |
| S103-01 | $\overline{Q4103}$ | 0V. |
| S104-01 | $\overline{Q4104}$ | 0V. |
| S105-01 | $\overline{Q4105}$ | 0V. |
| S106-01 | $\overline{Q4106}$ | 0V. |

The following table shows the manner in which the switches S101 to S106 are set for selected numbers of comparison sweeps.

| Switch Position | | | | | | Number of Sweeps For Comparison | Corr. Cycles |
|---|---|---|---|---|---|---|---|
| S106 | S105 | S104 | S103 | S102 | S101 | | |
| OFF | OFF | OFF | OFF | OFF | OFF | 1 | 112 |
| OFF | OFF | OFF | OFF | OFF | ON | 2 | 56 |
| OFF | OFF | OFF | OFF | ON | ON | 4 | 28 |
| OFF | OFF | OFF | ON | ON | ON | 8 | 14 |
| OFF | OFF | ON | ON | ON | ON | 16 | 7 |
| OFF | ON | ON | ON | ON | ON | 32 | 3.5 |
| ON | ON | ON | ON | ON | ON | 64 | 1.75 |

The logical expressions for the flip flop Q1018 are:

$$S1018 = S2101\text{-}01\ X1150C$$

$$R1018 = Q1018C.$$

The setting of the flip flop Q1018 for one clock period clears the Mod 1024 counter 58 in preparation for the correction cycle. As previously discussed, the counter is also reset by the master clear signal S2101-01 and X1120 which is true at the end of a comparison sweep.

Referring now to FIG. 27, the sweep count select switches 66 may be positioned to respond to the sweep counter as shown in the above table. NOR gates 580 and 582 function as an "and" gate and an inverter, respectively in response to the signals passed through the switches to apply a signal upon a coincidence condition to an inverter gate 584. A NOR gate 586 functions as an "and" gate in response to the sweep count signal from the gate 584 and in response to terms $\overline{X2318}$ and Q1017 to apply a signal X1150 through an inverter to the flip flop Q1018 to set the flip flop in combination with the normally false master clear term S2101-01. The flip flop Q1018 is reset in response to the term $\overline{Q1018}$ so as to only remain in the true state for one clock period.

Because in the illustrated system the sweep counter is reset every 11.25 degrees which is a binary sweep count equal to 112, the number of correction cycles that occur every 112 sweeps as shown in the above table is not always an integral number such as the selected comparison sweep of 32 and 64. As the sweep counter is reset every count of 112, the effective number of sweeps per correction for the comparison intervals 32 and 64 is respectively 34 and 112. The gate 586 develops the signal X1150 for controlling the flip flop Q1018.

$$X1150 = \overline{Q1017} \cdot X2318 \cdot \overline{S101} \cdot \overline{S102} \cdot \overline{S103} \cdot \overline{S104} \cdot \overline{S105} \cdot \overline{S106}$$

As X1150 is a signal that must be true for one clock period at the 160 mile point, the term X2318 is developed by combining the 9 least significant bits of the range counter in an "and" gate (not shown).

The flip flop Q1019 shown in FIGS. 4 and 28 is set for one clock period following the setting of flip flop Q1018 to enable the parallel shifting of the data in the digilog register into the counter flip flops to positions determined by the selected constant. The logical expressions for the flip flop Q1019 are:

$$S1019 = Q1018C.$$

$$R1019 = Q1019C.$$

As shown in FIG. 28, the flip flop Q1019 is set by the term $\overline{Q1018}$ and is reset by the term $\overline{Q1019}$.

At the beginning of the clock period after the flip flop Q1019 is set, the flip flop Q1020 shown in FIGS. 4 and 28 is set for 10 clock periods to enable serial shifting in the digilog register and the counter and to enable addition or subtraction to be performed at the flip flop Q1030. The logical expressions for the flip flop Q1020 are:

S1020 = Q1019C.

R1020 = Q1020.X2011C.

The signal X2011 is a timing pulse that occurs 12 clock periods after X2318 and may be developed by an appropriate gate (not shown) in the range counter 30. As shown in FIG. 28, the flip flop Q1020 is set by the term Q1019 and reset by a combination of the terms $\overline{Q1020}$ and $\overline{X2011}$.

Figure 29:
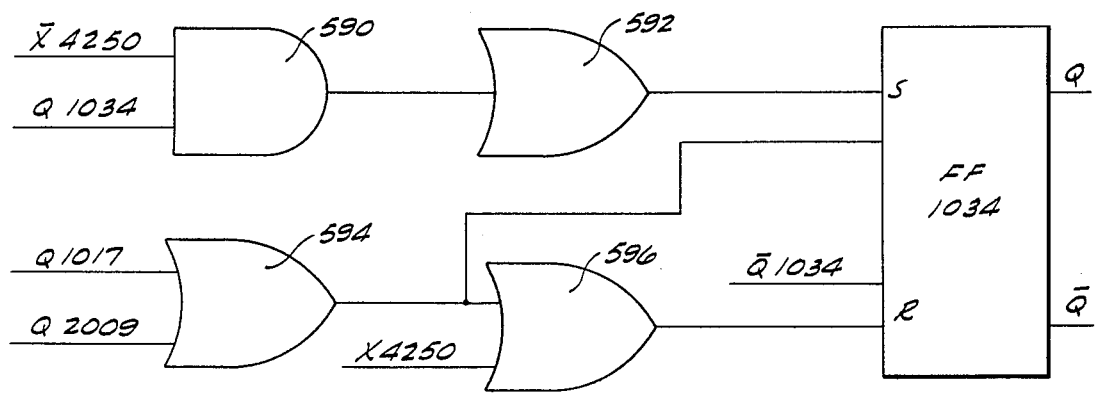
FIG. 29 is a schematic circuit and block diagram of the flip flop Q1034 utilized as a skimmer unlock control flip flop in the system of FIG. 4.

The skimmer unlock control flip flop Q1034 shown in FIGS. 4 and 29 functions to reset the flip flop Q1017 at the next quadrant boundary (X4250) if Q1034 is set or during a master clear operation. When the flip flop Q1017 is set in response to a jamming signal Q2009 or a counter overflow, the flip flop Q1018 is inhibited from being set which maintains the skim level at its preceding value. The logical expressions for the flip flop Q1034 are:

S1034 = (Q1017+Q2009) X4250.$\overline{Q1034C}$.

R1034 = $\overline{Q1017}$.$\overline{Q2009}$+X4250.Q1034C.

If the threshold level is set at a low value, the counter may overflow each comparison interval because of the low skim level rather than from jamming. Thus, the flip flop Q1017 will be set by the overflow action and will be continually set and the skimmer is locked. However, if Q1017 is set for 90 degrees or more, Q1034 is set which activates X1160 for one bit time. The term X4250 is the quadrant boundary indicator signal. As previously discussed, the term X1160 resets the skimmer by forcing a "one" into the flip flop Q1029 of the digilog register to raise the skim level to a relatively high value. During system jamming the flip flop Q1034 is set by the jamming signal Q2009 at the next quadrant boundary indicated by X4250. Thus, when the system is subjected to legitimate system jamming or when the skim level is set too low, the skimmer will reset by forcing a "one" into the register somewhere in the interval 90°+ILSD and 180°−ILSD where the LSD is the least significant digit of the sweep counter 40.

Referring now to FIG. 29, a NOR gate 590 functions as an "and" gate in response to terms $\overline{X4250}$ and Q1034 to apply a signal through an inverting gate 592 to a set terminal of the flip flop Q1034. A NOR gate 594 functions as an "or" gate in response to terms Q1017 and Q2009 to apply a set signal to the flip flop. A NOR gate 596 functions as an "or" gate in response to the signal developed by the gate 594 and a term X4250 to apply a reset signal to the flip flop Q1034 in combination with the term $\overline{Q1034}$.

Referring now to FIG. 30, the digital to analog converter 46 may be of any conventional type as is well known in the art. The true output signals from each flip flop Q1021 to Q1029 are each applied to a different gate such as 606 and 607 to switch either +20 volts or ground onto leads such as 600 and 602. A lead 604 at the most significant bit position is coupled to −20 volts by a gate 609 with an input coupled to ground to schematically signify that the gate 609 is always true. This forces the output signal of the D to A converter 46 to always be a negative voltage. When the signal Q1021 is true of the least significant bit position, the switch 606 applies ground to the lead 600 rather than the +20 volt potential. Similarly the gate 607 applies +20 volts or ground potential to the lead 602 when the signal Q1029 is respectively false or true. Each lead such as 600, 602 and 604 is coupled through resistors 610, 612 and 614 to a summing path 616, with the resistors having selected weighting values. The path 616 includes a resistor 618 coupled between the resistor 610 and a resistor (not shown) for the flip flop Q1022, a resistor 620 coupled between the loading resistor (not shown) for the flip flop Q1028 and a resistor 622 coupled between the resistor 620 and the output lead 47 which applies the analog skim level to the difference amplifier 44. All of the resistors in the path 616 may be of similar values. The switches such as 606, 607 and 609 are of a conventional type and may each include three transistors, one for switching, one for gating ground potential to the lead 600 and one for gating +20 volts to the lead 600 or 602. The ladder summing network of FIG. 30 may respond to an increasing digital number to change the analog skim voltage a portion of a voltage range from −10 volts to −0.01 volts, for example.

Figure 31:
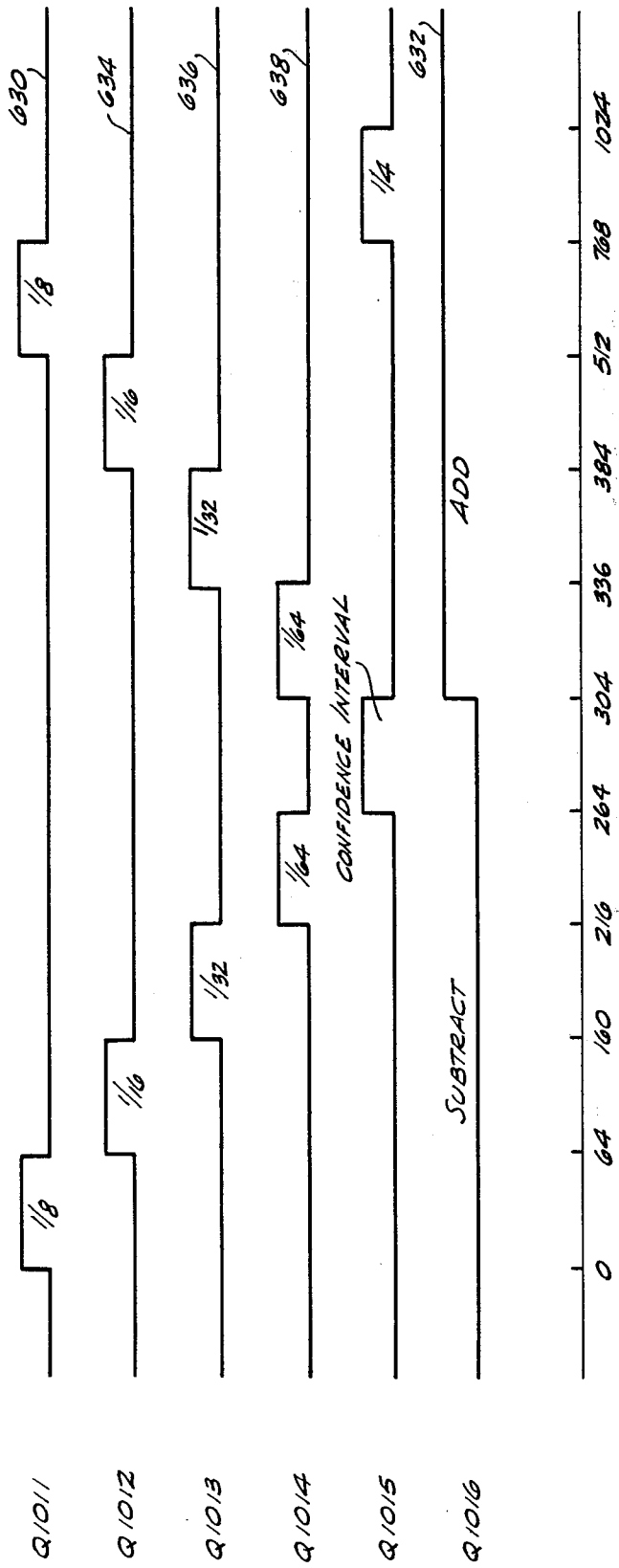
FIG. 31 is a schematic diagram showing waveforms of voltage versus accumulated hit counts for further explaining the operation of the constant selector flip flops in the system of FIG. 4.

Referring now to FIG. 31, the change of states of the constant selector flip flops as a function of accumulated count will be explained in further detail. The flip flop Q1011 is set at the count of 0, reset at a count of 63, set at the count of 512 and reset at the count of 767 as shown by a waveform 630 to indicate a weighting factor of ⅛ for either subtraction or addition as determined by a waveform 632 of the flip flop Q1016. The flip flop Q1012 provides a weighting factor of 1/16 to be added or subtracted from the contents of the digilog register and is set on the count of 64, reset on the count of 159, set on the count of 384 and reset on the count of 511 as shown by a waveform 634. The flip flop Q1013 which represents a weighted correction factor of 1/32 is set on the count of 160, reset on the count of 215, set on the count of 336 and reset on the count of 383 as shown by a waveform 636. The flip flop Q1014 which represents the 1/64 correction constant is set on the count of 216, reset on the count of 263, set on the count of 303 and reset on the count of 335 as shown by a waveform 638. The flip flop Q1015 is set during the confidence interval of the selected false alarm rate between the count of 264 and 303 and for indicating a ¼ correction constant to be added to the contents of the register is set at the count of 768 and reset at the count of 1024. The logical expressions are selected to set and reset the flip flops Q1011 to Q1016 in accordance with the count shown in FIG. 31 and the state of the flip flops at the start of a correction cycle controls the desired shifting of the contents of the register into the counter.

Referring now to FIGS. 32 and 33, the operation of the video skimmer of FIG. 4 will be explained in further detail. The range counter 30 develops a master trigger signal of a waveform 640 which controls the radar system 22 to transmit a pulse of energy into space from the feed of the antenna 26 which also intercepts return energy from objects in space. At the same time the master trigger signal is applied to the sweep generator in the radar system to initiate the range sweep. Because the detection of targets and control of the skim level is between the ranges of 80 and 160 nautical miles for the illustrated system, an 80 mile count signal from the flip flop Q2309 is applied to the counter 58. It is to be understood that although the return energy target signals are not counted for the first 80 nautical miles of range in the illustrated system, the principles of the invention are applicable to rejecting other range intervals or to receiving energy from objects at all ranges. As shown by a waveform 642 of FIG. 32, the flip flop Q2309 of the range counter is set between the 80 and 160 mile ranges to allow the counter 58 to count. As shown in FIG. 33, the terms Q2301 and $\overline{Q2301}$ of respective waveforms 644 and 646, which are alternately true during the entire range count, are applied to the choppers 79 and 85 and the choppers 96 and 87 of FIG. 5 so that an integrated voltage of a waveform 648 is applied to the lead 79 from either the integrator 82 or 100. A similar integrated voltage is developed by the other integrator during alternate clock periods. The difference amplifier 94 develops a signal of a waveform 650 on the lead 119 and the threshold detector 128 develops the signal of a waveform 652. It is to be noted that the signals of the waveforms 648, 650 and 652 are shown for the video signal exceeding the skim level during each range bin interval, and in the absence of sufficient signal amplitude the pulses of the waveform 652 are not developed. The signals of the waveform 652 are then applied to the gating and pulse stretching circuits of FIG. 6 during each clock period to either reset the flip flop Q1032 indicating a hit or that the integrated signal exceeds the skim level or to set the flip flop Q1032 to the false state indicating the absence of a hit or that the video signal does not exceed the skim level. As discussed previously, the flip flop Q1032 includes an inverter driver at the output terminals so that the signal Q1032 is true when the flip flop is reset as a result of a hit condition.

The clock pulses of the waveform 654 and the anti-race clock pulses of the waveform 656 are continuous and have a pulse repetition frequency to define the range bin intervals of 625 yards (3.8 microseconds) in the illustrated system. The clock pulse has voltage levels of 0 volts and −8 volts and the anti-race clock pulse has voltage levels of +6 volts and −2 volts. As explained relative to the flip flop of FIG. 10, the anti-race clock pulse provides a delay before a flip flop is triggered to an opposite state.

A correction of the skim level is performed at the end of a selected number of sweeps such as eight as determined by the setting of the switches S101 to S106. When the sweep counter 40 reaches the selected count value, the signals S101 to S106 are all at true levels at the beginning of the sweep interval as shown in FIG. 32, and at the start of the radar "dead time" at the 160 mile range time, the end of sweep signal X2318 of a waveform 660 goes to a true level to develop the comparison sweep indicator signal X1150 of a waveform 666. The range counter signal $\overline{Q2301}$ of a waveform 664 is indicated in FIG. 32 and the signal Q1017 of a waveform 665 is maintained at a false level indicating the absence of a jamming or interference condition. At the same clock pulse, the flip flop Q1018 is set as shown by waveforms 668 and 670 of respective FIGS. 32 and 33, and the counter 58 is reset. It is to be noted that during the accumulated signal count of the eight sweeps, for example, the state of the counter 58 sets and resets the constant selector flip flop which retains the correction constant for use during the correction cycle. At the next clock pulse after the flip flop Q1018 is set, the flip flop Q1019 is set as indicated by waveforms 674 and 678 of respective FIGS. 32 and 33. During the clock period that the flip flop Q1019 is set, the digital skim level in the register 62 is parallel shifted into the counter 58 to weighted positions as determined by the states of the constant selector flip flops. During the next ten clock periods, the flip flop Q1020 is true as shown by waveforms 680 and 682 of FIGS. 32 and 33 and the contents of the flip flops Q1001 and Q1021 and the carry-borrow flip flop Q1031 are applied to the adder flip flop Q1030 which performs addition or subtraction as determined by the state of the flip flop Q1016. The contents of the register 62 are shifted in a rotational manner and the contents of the counter 58 are shifted out without restoring the data. The signal X2011 goes to a positive level, 12 clock periods after X2318 so as to be positive during the tenth period of the serial shifting operation and the flip flop Q1020 is reset as shown by the waveforms 680 and 682. The corrected digital skim level is thus applied to the difference amplifier of the circuit 44 and is utilized during the next sweep period. It is to be noted that the digital skim level is continually applied to the difference amplifier even during the correction cycle, but a corrected value is present before a subsequent skimmer operation.

The carry-borrow flip flop Q1031 may be controlled to be set to a "one" state at all times during a correction operation except when the count is within the confidence interval. When the correction is 1/64 the parallel shift or 6 places is quantized to zero, if the value of the skim level is of a sufficiently low voltage to be expressed by 6 digits. Thus when this carry-borrow operation is selected, the skim level is always increased by at least one least significant bit. It is to be noted that arrangements may be utilized in accordance with the principles of this invention to force the "one" into the carry-borrow flip flop only under a 1/64 correction condition, for example.

The three basic situations that are controlled by the jam indicator flip flop Q1017 are legitimate system jamming, a false jam indication when the skim level is set too low to correct itself and an overflow of the counter 58. The counter overflows at a count of 50 percent of the total possible counts for eight sweeps or at 1024 so that this is interpreted as a jamming condition to set the flip flop Q1017. During system jamming the signal Q2009 is also developed in the detector to set the flip flop Q1017. When comparison intervals such as 16, 32 and 64 sweeps are selected by the switches of FIG. 27, the skim level is raised to higher values than 3 db to provide a selectable skim level feature in accordance with the invention. It is to be noted that with comparison intervals of 16, 32 or 64 sweeps the counter overflows when the number of noise returns is respectively 25, 12.5 and 6.25 percent of the total possible count. However, this does not affect the satisfactory operation because the signal Q2009 may be developed by a criteria in the detector to indicate jamming prior to an overflow condition. When the skim level is set at a very low value such as during start up, the counter may overflow each comparison interval so that Q1017 is continually set and a correction would not be allowed. However, the flip flop Q1034 is set if Q1017 is set for 90 degrees in azimuth and the skim level is increased by forcing a "one" into the flip flop Q1029 to instantaneously raise the skim level. If this forced correction is excessive, the proper skim level is reached after several correction cycles.

Thus, there has been described a video skimmer system that effectively utilizes the average noise power sensed in a range bin for a selected last portion of the radar as the feedback criteria for correction of the skim level. A weighted smoothing correction operation based upon the noise returns for the selected region is utilized so as to provide a reliable and stable skim level and a constant false alarm rate. The system recognizes the presence of clutter and jamming and during jamming the previous skim level is maintained. A highly simplified and reliable correction operation is provided utilizing selected correction constants. The system with the sample interval of 8 sweeps has been found to operate with a 3 db skim level or power ratio of the skim level to the RMS noise and a 13.2 false alarm rate or percentage of false target signals caused by noise. The system also allows selection of desired skim levels relative to the noise power.

What is claimed is:

1. A system responsive to a composite signal including first signals in the presence of second signals and detecting the presence of said first signals with a selected threshold level ratio of signal voltage to noise voltage comprising means for integrating the composite signal over selected intervals of time, means for comparing a selectable threshold level with the integrated signals, means for storing data to provide said threshold level, counting means responsive to the integrated signals exceeding the threshold level to accumulate a count thereof, constant selector means responsive to the count of said counting means to establish a proportion of the value of said stored data for changing said threshold level to maintain the selected threshold level ratio, and means responsive to said constant selector means for correcting the stored data after a selected number of said intervals of time.

2. A video signal skimming system responsive to a source of signals and noise to maintain a selected power ratio of a threshold level to RMS noise comprising means for determining the average signal and noise voltage during each of a plurality of repetitive intervals, means for comparison of a variable threshold level with the average voltage during each repetitive interval to develop a signal when said average voltage exceeds said threshold level, means for accumulating a count of the number of times said average voltage exceeds said threshold level over a selected number of said repetitive intervals, means for storing a digital value of said threshold level and coupled to said means for comparison for controlling said threshold level, means responsive to said accumulated count to select a constant representative of a proportionate amount of said digital value for correcting said threshold level to maintain the selected power ratio, and means responsive to said selected constant to correct said digital value to control said threshold level so as to maintain said selected power ratio.

3. A system responsive to a composite signal including first signals in the presence of second signals and detecting the presence of said first signals with a selected threshold level ratio comprising means for integrating the composite signal over each of a plurality of selected intervals of time, means for comparing a selectable threshold level with the integrated signals, register means for storing a digital number representative of said threshold level, digital to analog converter means coupled to said register means and said means for comparing to apply said selectable threshold level thereto, counting means responsive to the integrated signals exceeding the threshold level during each interval of time to accumulate a count thereof, constant selector means responsive to the count of said counting means to establish as a function of the accumulated count, a proportion of the value of said stored data for changing said threshold level to maintain the selected threshold level ratio, and means responsive to said constant selector means and coupled to said register means and counting means for correcting the stored data after a selected number of said intervals of time.

4. A signal skimming system responsive to a composite signal including target signals and noise signals, for detecting said target signals at a selected and substantially constant false alarm rate comprising means for integrating the composite signal over selected intervals of time, comparison means for comparing the integrated signal with a selectable skim level, storage means coupled to said comparison means for storing data to apply said skim level to said comparison means, counting means responsive to the integrated signals exceeding the threshold level to accumulate a count thereof, and feedback means coupled between said counting means and said storage means for correcting said skim level as a function of the ratio of the probability of obtaining the selected false alarm rate to the probability of obtaining the false alarm rate of the accumulated count.

5. A video skimming system responsive to a composite signal including target signals and noise signals to detect the target signals with a substantially constant false alarm rate comprising integrating means for developing a signal representative of the average power of said composite signal during each of a plurality of periodic intervals of time, threshold detecting means responsive to a skim voltage and the signal from said integrating means to pass a target representing signal when the integrated signal exceeds said skim level, a counter coupled to said threshold detecting means to accumulate the count of target signals over a selected number of periodic intervals, a skim level data register for storing a digital value of said skim level, converting means coupled between said data register and said threshold detecting means for responding to said digital value to apply said skim voltage to said threshold detecting means, constant selector means coupled to said counter and said data register for responding to the accumulated count to select a constant of said digital value for correction to maintain the substantially constant false alarm rate, and means coupled to said counter, said constant selector means and said data register for correcting said digital value in response to said constant after a selected number of periodic intervals to maintain said substantially constant false alarm rate.

6. A signal detecting system responsive to a composite signal including target signals and noise signals, said system detecting target signals at a selected false alarm rate comprising threshold detecting means responsive to said composite signal to compare the average voltage level during each of a plurality of time intervals with a detecting level voltage and develop a quantized target signal during each interval when the average voltage level exceeds said detecting level voltage, a digital counter coupled to said threshold detecting means for accumulating a count of the quantized target signals over a selected number of time intervals, said counter overflowing in response to a selected count being a predetermined proportion of the selected number of time intervals, a data register for storing a digital value of said detecting level voltage, converter means coupled from said data register to said threshold detecting means for applying said detecting level voltage thereto, a plurality of constant selector flip flops coupled to said counter for selecting correction constants in response to the accumulated count, said constants representing a portion of the stored digital value for correcting said stored digital value to maintain said constant false alarm rate as a function of the ratio of the probability of obtaining the selected false alarm rate to the probability of obtaining the false alarm rate of the accumulated count, first means coupled to said constant selector flip flops, to said counter and to said register for correcting the stored digital value after the selected number of count intervals, and second means coupled to said first means and to said counter for inhibiting said correction when said counter overflows in said selected number of count intervals.

7. A signal skimmer system for selecting target signals with a substantially constant and selected false alarm rate in the presence of noise signals as developed by a radar system periodically transmitting pulses of energy into space at selected azimuth positions during each of a plurality of sweep intervals and receiving energy over a selected portion of each sweep interval comprising timing means for defining range bin intervals during each sweep interval, integrating means responsive to the radar system for developing a signal respresentative of the average noise power during each range bin interval, threshold detecting means having a variable skim voltage and responsive to the integrated voltage to pass a target indication signal when the integrated signal exceeds said skim voltage, counting means coupled to said threshold detecting means for accumulating a count of said target indication signals during the selected portion of each sweep interval over a selected number of sweep intervals, a data register coupled to said threshold detecting means for storing data representing said skim voltage, and feedback means coupled between said counting means and said data register for changing said skim voltage as a function of the ratio of the probability of obtaining the selected false alarm rate at the accumulated count to the probability of obtaining the accumulated count for maintaining the substantially constant and selected false alarm rate.

8. A signal skimming system for indicating target signals with a selected and substantially constant false alarm rate operable in a radar system transmitting pulses of energy into space at a plurality of azimuth directions and receiving return energy during sweep periods defined by said transmitted pulses of energy, said skimming system responding to interference conditions in space, said radar system developing a video signal including target and noise signals, said radar system including a range counter for counting range bin intervals during each sweep period comprising first and second integrators coupled to the range counter for developing integrated signals during alternate range bin intervals, threshold comparison means coupled to said first and second integrators and responsive to a skim level signal to pass a target signal when the integrated signal exceeds said skim level by a predetermined voltage, a digital counter coupled to said threshold comparison means for accumulating a count of the number of target signals passed by said threshold comparison means over a selected portion of each sweep and over a selected number of sweeps, a data storage register for storing a digital value of said skim level signal, digital to analog converter means coupled from said data storage register to said threshold comparison means for applying said skim level signal thereto, constant selector means coupled to said digital counter for selecting correction constants in response to said accumulated count, each correction constant representing a portion of the stored digital value to be combined therewith and being a function of the probability of obtaining the selected false alarm rate to the probability of obtaining the accumulated count, means coupled to said counter for clearing said counter after the selected number of sweeps to initiate a correction cycle, means coupled to said register and said counter for shifting the digital data from said register to said counter to a weighted position as determined by the selected correction constant, arithmetic means coupled to said counter and said register for serially shifting the counter and register data therethrough and into said register to represent a corrected skim level signal, means coupled to said means for clearing said counter to inhibit said counter from being cleared during an interference condition in space, and means coupled to said counter to control said counter to be cleared at the termination of said interference condition to initiate a correction cycle.

9. A signal detecting system for indicating target signals at a selected false alarm rate operable in a radar system transmitting pulses of energy into space at varying azimuth positions and responding to the return energy to develop video signals during each of a plurality of range bin intervals over each of a plurality of range sweeps of energy pulses comprising range counting means for defining a plurality of range bin intervals during each range sweep, integrating means responsive to said video signal to develop an integrated voltage during each range bin interval, threshold comparison means coupled to said integrating means and responsive to a skim level voltage to develop a target signal when the integrated voltage exceeds said skim level by a predetermined voltage, digital counting means coupled to said threshold comparison means and to said range counting means for accumulating a count of said target signals over a portion of each range sweep greater than a predetermined range and for a selected number of sweeps, first means coupled to said counting means for resetting said counting means after a selected number of sweeps, second means coupled to said first means for selecting said number of sweeps, a register coupled to said threshold comparison means for storing data representative of said skim level voltage and applying said skim level voltage to said threshold comparison means, feedback means coupled between said counter means and said register for correcting said skim level data after the selected number of sweeps at the accumulated count as a function of the probability of obtaining the selected false alarm rate at the accumulated count to the probability of obtaining said accumulated count, means for indicating a jamming condition, and means coupled to the means for indicating a jamming condition, to said feedback means and to said counting means to inhibit the counting operation and the correction operation during a jamming condition.

10. A video signal skimmer system operable in response to a radar system transmitting and receiving energy from objects during each of a plurality of range sweep intervals of transmitted pulses of energy, said radar system developing video signals including noise signals, target signals and interference signals, said video skimmer detecting target signals with a selected and a substantially constant false alarm rate comprising a range counter for defining range intervals during a selected portion of each range sweep interval, integrating means coupled to said range counter and responsive to the video signals during each range interval for developing integrated signals, threshold comparison means coupled to said integrating means and responsive to a skim level voltage to develop a quantized target signal during each range bin interval when the integrated signal exceeds the skim level by a predetermined voltage, a target signal counter coupled to said threshold comparison means for accumulating a count of the quantized target signals over a selected number of sweeps, a digital skim level data storage register, converter means coupled between said register and said threshold comparison means for applying the skim level voltage thereto, constant selector means coupled to said counter for selecting correction constants in response to predetermined intervals of said accumulated count, each correction constant representing a portion of the stored digital value to be combined therewith and being a function of the ratio of the probability at the accumulated count interval of obtaining the selected false alarm rate to the probability of obtaining the count interval of that accumulated count, first means coupled to said counter for clearing said counter after the selected number of sweep intervals and initiating a correction cycle, second means coupled to said first means, to said register, to said counter and to said constant selector means for shifting signals representing the digital data from said register to said counter with a weighted value selected by said constant selector means, arithmetic means coupled between said counter and said register for combining the contents of said counter and said register, third means coupled to said counter, said register and said arithmetic means for controlling the combining of the data therein to develop a corrected digital skim level, fourth means coupled to said counter for responding to an overflow thereof to inhibit said first means from initiating said correction cycle, and fifth means coupled to said fourth means, to said radar system and to said register for increasing the value of said digital skim level after a selected number of radar sweeps when said fourth means inhibits said first means from initiating said correction cycle.

11. A video signal skimming system responsive to video signals developed by a radar system during each of a plurality of sweep intervals transmitting pulses of energy into space and receiving reflected energy from targets and from interference conditions over a plurality of range intervals as defined by a range counter during each sweep interval, the video signals including target signals and noise signals, the skimmer system detecting the target signals with a substantially constant false alarm rate comprising integrator means coupled to the range counter and responsive to the video signals to develop signals having amplitudes representative of the average voltage during each range interval, detecting means coupled to said integrator means for comparing a skim level voltage with the integrated signal and developing a quantized target signal during each range interval when said integrated voltage exceeds said skim level voltage by a predetermined amplitude, a target counter coupled to said detecting means for counting the quantized target signals therefrom, a digital storage register for storing the skim level voltage as a digital number, converter means coupled between said register and said detecting means for applying said skim level voltage thereto, constant selector means coupled to said target counter for selecting correction constants in response to the accumulated count, each correction constant representing a portion of the stored digital value to be combined therewith and being a function of the ratio of the probability of obtaining the selected false alarm rate at that count to the probability of obtaining the accumulated count, a first control flip flop coupled to said target counter for clearing said counter after a selected number of sweep intervals to initiate a correction cycle, sample interval control means coupled to said first control flip flop for selecting a number of sweep intervals before clearing said target counter, a second control flip flop coupled to said first control flip flop, to said constant selector means, to said storage register and to said target counter for shifting the digital number of said storage register into said counter at a weighted digital position determined by the selected constant, arithmetic means coupled to said storage register, a third control flip flop coupled to said second control flip flop, to said counter, to said arithmetic means, to said storage register, and to said constant selector means for serially combining the digital numbers of said counter and said register to develop a corrected digital number in said storage register to form the skim level voltage, correlator means coupled to said detecting means for selecting an interference condition of target signals, and means coupled to said correlator means and said first control flip flop for preventing the correction cycle during an interference condition.

12. A video skimmer system responsive to a video signal developed by a radar system during each of a plurality of sweep intervals transmitting pulses of energy into space and receiving reflected energy over a plurality of range intervals as defined by a range counter during each sweep interval, the video signal including target signals and noise signals, the skimmer system detecting the target signals with a substantially constant false alarm rate comprising integrator means coupled to the range counter and responsive to the video signal to develop signals having amplitudes representative of the average voltage during each range interval, detecting means coupled to said integrator means for comparing a skim level voltage with the integrated signal and developing a quantized target signal during each range interval when said integrated voltage exceeds said skim level voltage by a predetermined amplitude, a target counter coupled to said detecting means for counting the quantized target signals therefrom, a digital storage register for storing the skim level voltage as a digital number, converter means coupled between said register and said detecting means for applying said skim level voltage thereto, constant selector means coupled to said target counter for selecting correction constants in response to the accumulated count, each correction constant respresenting a portion of the stored digital value to be combined therewith and being a function of the ratio of the probability of obtaining the selected false alarm rate at that count to the probability of obtaining the accumulated count, a first control flip flop coupled to said target counter for clearing said counter after a selected number of sweep intervals to initiate a correction cycle, sample interval control means coupled to said first control flip flop for selecting a number of sweep intervals before clearing said target counter, a second control flip flop coupled to said first control flip flop, to said constant selector means, to said storage register and to said target counter for shifting the digital number of said storage register into said counter at a weighted digital position determined by the selected constant, arithmetic means coupled to said storage register, a third control flip flop coupled to said second control flip flop, to said counter, to said arithmetic means, to said storage register, and to said constant selector means for serially combining the digital numbers of said counter and said register to develop a corrected digital number to form the skim level voltage and maintain said substantially constant false alarm rate.

* * * * *